(12) United States Patent
Turner

(10) Patent No.: US 7,548,942 B2
(45) Date of Patent: Jun. 16, 2009

(54) BASE FOUR PROCESSOR

(75) Inventor: Robert Stephen Turner, Sterling Heights, MI (US)

(73) Assignee: Robert S. Turner, Sterling Heights, MI (US)

( * ) Notice: Subject to any disclaimer, the term of this patent is extended or adjusted under 35 U.S.C. 154(b) by 1101 days.

(21) Appl. No.: 10/945,483

(22) Filed: Sep. 20, 2004

(65) Prior Publication Data

US 2006/0064450 A1    Mar. 23, 2006

(51) Int. Cl.
*G06F 7/38* (2006.01)
(52) U.S. Cl. .................................... 708/490
(58) Field of Classification Search .................. 708/490
See application file for complete search history.

(56) References Cited

U.S. PATENT DOCUMENTS

| | | | |
|---|---|---|---|
| 4,879,642 A | 11/1989 | Malka | |
| 5,467,298 A | 11/1995 | Yoshida | |
| 5,677,859 A | 10/1997 | Kanayama | |
| 5,729,487 A * | 3/1998 | Dufal et al. | 708/656 |
| 5,977,891 A * | 11/1999 | Turner | 341/83 |
| 5,983,255 A | 11/1999 | Musicus | |
| 6,073,149 A | 6/2000 | Shou | |
| 6,275,841 B1 * | 8/2001 | Potter et al. | 708/620 |
| 6,826,587 B1 * | 11/2004 | Montalvo et al. | 708/622 |
| 2003/0097392 A1 * | 5/2003 | Masteller | 708/672 |

\* cited by examiner

*Primary Examiner*—Tan V Mai

(57) ABSTRACT

A digital signal processing system which samples an analog voltage, converts the sample to a multi digit base four number, performs a computation with this number, using base four arithmetic, and converts the result back to an analog voltage. This system is comprised of a system an analog to digital converter, an arithmetic logic unit, a digital to analog converter, a system controller, and a memory. The analog to digital converter samples the analog signal and converts the samples into base four numbers. The arithmetic logic performs computations on the samples. The digital to analog converter converts the results of the computations back into analog signals. The system controller controls the operation of the arithmetic logic unit, and the memory stores the command instructions for the system controller. The main advantage of using base four arithmetic instead of binary is much faster through put.

11 Claims, 22 Drawing Sheets

A State of The Art System

A Base Four System

Base Four Processor & Memory n Digit Base Four Register

Base Four Storage Element

Base Four to Base Two Converter

Base Two to Base Four Converter

System Controller ROM

Electronic Switch

Carry Register

Adder Circuit

Multiplier Circuit

Base Four Adder

Base Four Multiplier

BASE FOUR PROCESSOR

BACKGROUND

1. Field of the Invention

This invention relates to central processing units which perform arithmetic operations in real time, and more particularly to those units which operate on real time analog signals.

2. Description of Prior Art

The techniques of digital processing of analog signals are being used in many new applications as microprocessors are becoming less expensive. These applications currently range form the filtering of audio signals to the control of heavy machinery.

A state of the art system which performs this processing is shown in FIG. 1. This system operates as follows.

The analog signal is, first, sampled, and the value is converted to a binary number. This function is performed by the binary analog to digital converter.

A computation is, next, performed on the binary number which represents the signal value. This computation typically involves a difference equation. In a difference equation, the current signal value, along with several previous signal values, are multiplied by constants, and the products are added together.

The sum is, then, converted to an analog voltage level, and is output as an analog signal. This function is performed by the binary digital to analog converter.

The problem with the state of the art systems is that many arithmetic operations are required to perform the computation.

For example, a product of two four bit binary numbers requires sixteen bit wise multiplications, six shifts, and twenty-one bit wise additions with carry. This single product would, therefore, require forty-three arithmetic operations. Each operation requires processor time, so the through put is slow.

Many state of the art systems use multiple processors to attempt to solve the problem of slow through put. The use of multiple processors, however, requires that a processor be used as a resource manager. The resource manager must communicate with, and control, the other processors, and this, in turn, slows the through put.

Objects and Advantages

In this patent application, a digital signal processing system is proposed which has faster through put. The proposed system utilizes the base four numbering system instead of the binary numbering system. This system, FIG. 2, functions as follows.

The analog signal is, first, sampled, and the value is encoded as an eight digit base four number. A base four computation is, next, performed on this number. The result is, then, converted back to an analog voltage level, and is output as an analog signal. This system has the following advantages.

The first advantage is that fewer arithmetic operations are required to perform an equivalent computation. A product of two digit base four numbers, for example, would require four digit wise multiplications, one shift, and three additions with carry. This is a total of eight arithmetic operations. This computation is equivalent to a product of two four bit binary numbers, and such a computation would require forty-three arithmetic operations, as previously discussed.

The next advantage is that a base four number can be multiplied or divided by four by a single left or right shift operation, respectively. A binary number would require two shift operations to be multiplied or divided by four. A base four number can, however, be multiplied or divided by two if the number is first converted to binary, by hardware, and then shifted.

Another advantage of a base four system is that a program branch can go one of four different ways. A program branch in a binary system can only go one of two ways. A program, in a base four system, would, therefore, require fewer steps to make decisions.

The final advantage of base four is that fewer control lines and bus lines are required, than are required by an equivalent binary system, since each line carries more information.

A base four system can, therefore, perform the same functions as a state of the art system, but requires fewer operations, since a base four system operates on larger pieces of information. A base four system, therefore, has better through put than a state of the art system.

DRAWING FIGURES

Description—FIGS. 3-14

Figure 1:
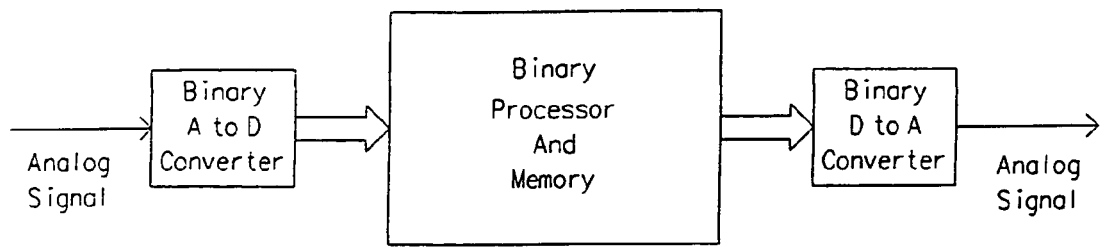
FIG. 1 shows a state of the art system which processes analog signals. A binary analog to digital converter, a processor and memory, and a binary digital to analog converter are all shown.
Figure 2:
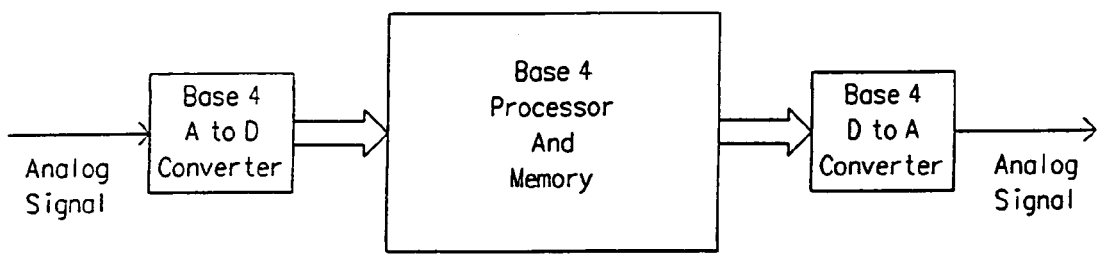
FIG. 2 shows a base four system which processes analog signals. A base four analog to digital converter, a base four processor and memory, and a base four digital to analog converter are shown.
Figure 3:
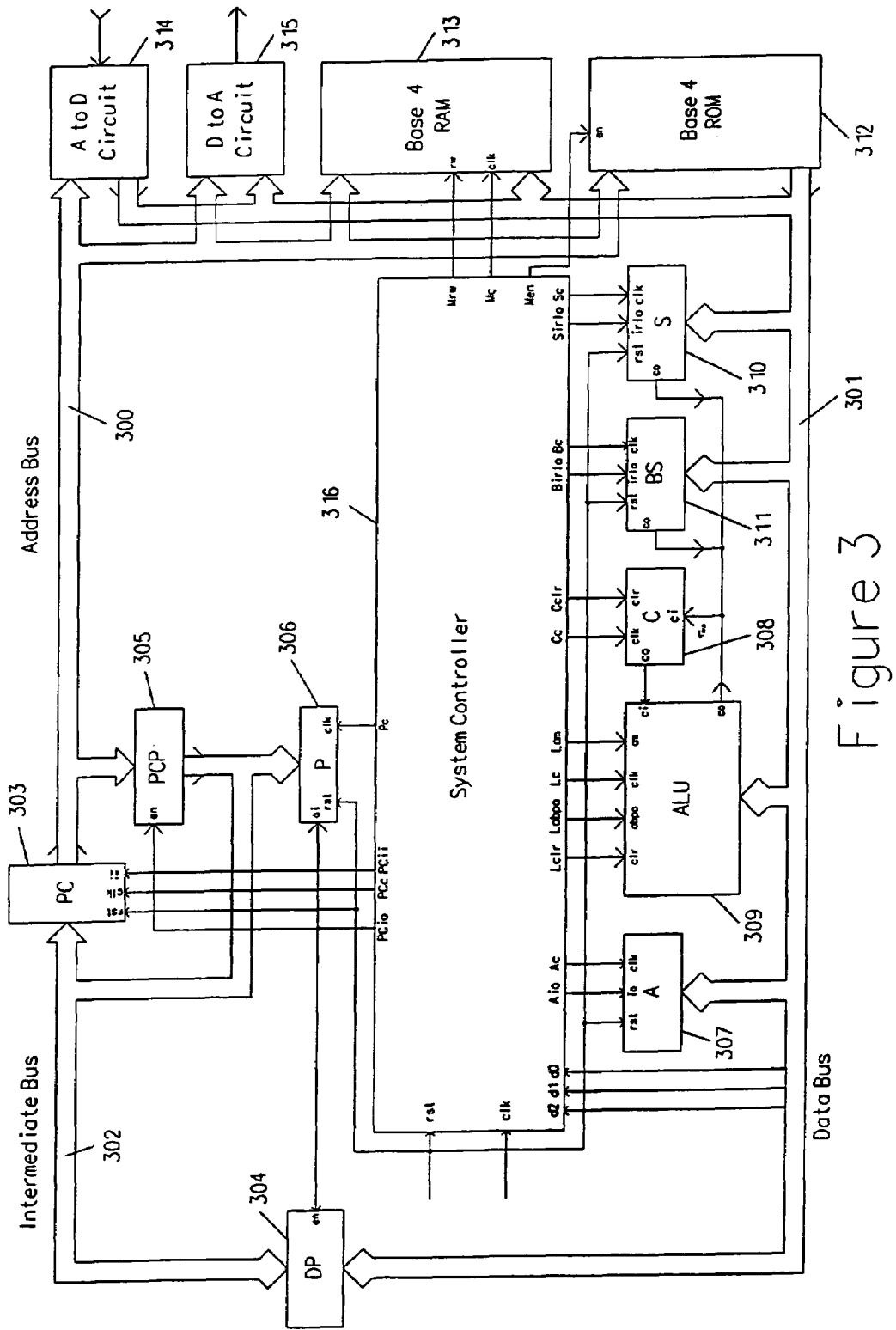
FIG. 3 shows a block diagram of a base four system. All of the components, as well as the interconnecting busses are shown.

This invention, FIG. 3, is composed of many sub systems, components, and sub components. A detailed description of the structure of each sub system, component, and sub component is given below.

Figure 4:
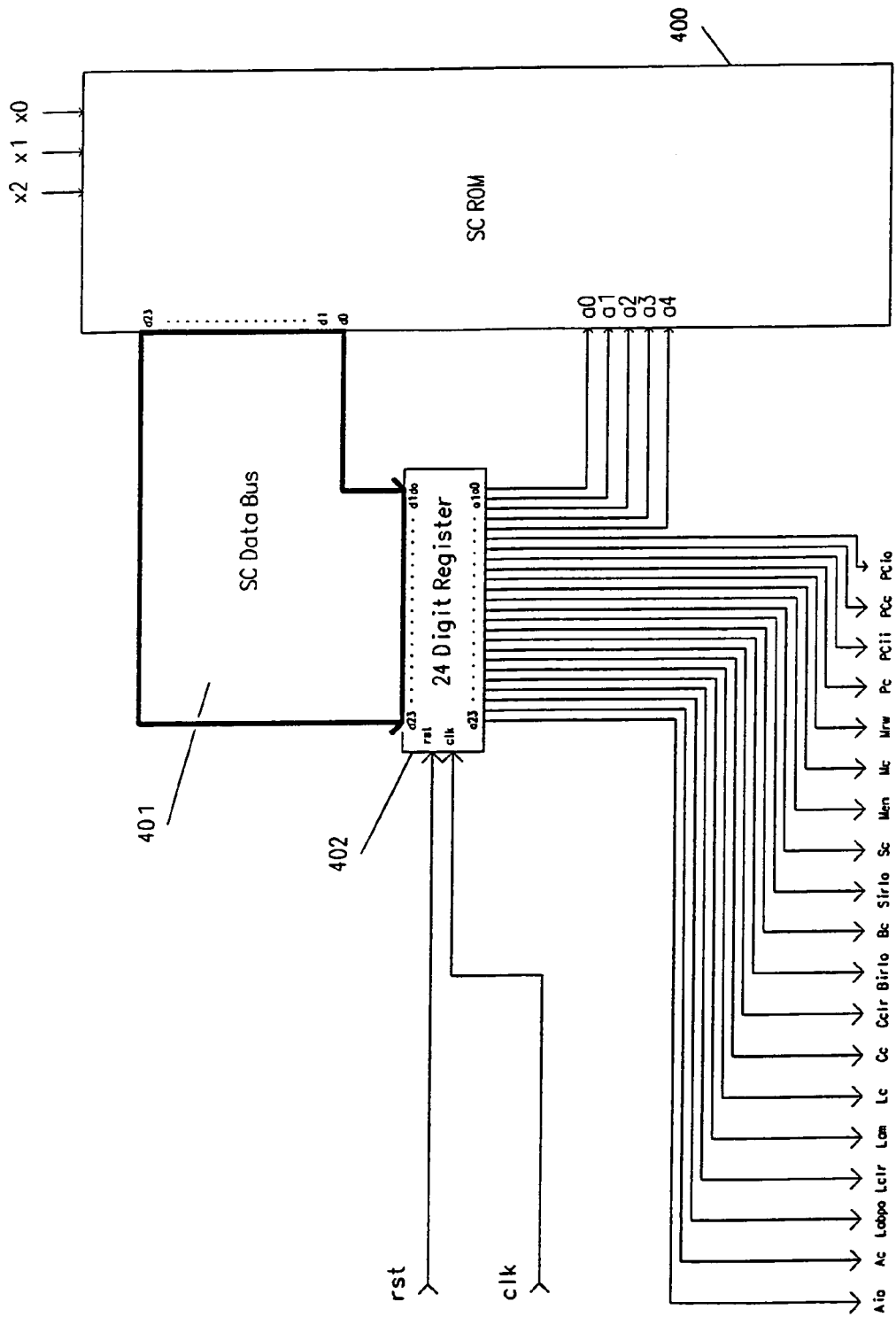
FIG. 4 shows a block diagram of the system controller. A 24 digit base four register, system controller ROM, interconnecting bus, and control lines are shown.

The system controller, FIG. 4, is composed of a twenty-four digit register, and a twenty-four digit wide by 1024 location base four ROM.

Figure 5:
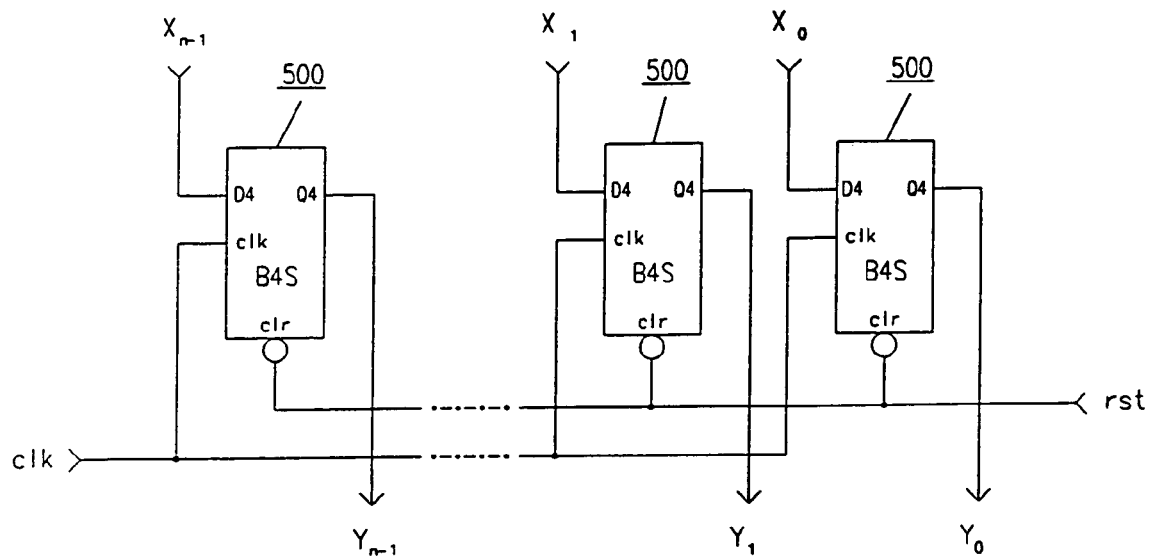
FIG. 5 shows a block diagram of an n digit base four register. Base four storage elements B4S are shown.
Figure 6:
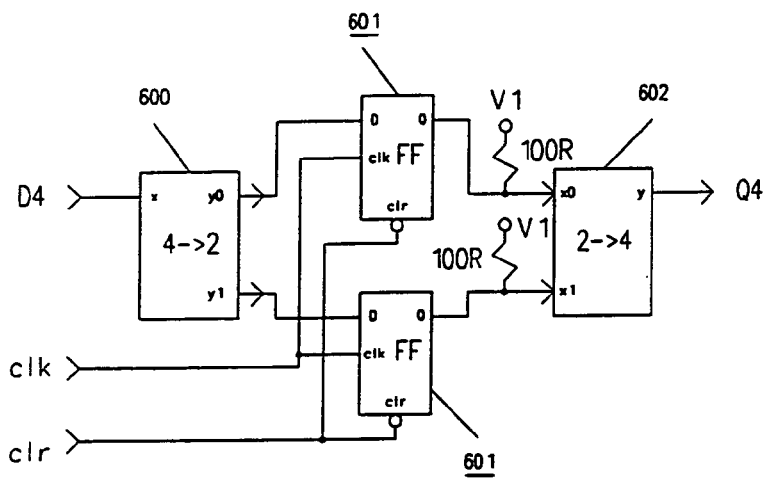
FIG. 6 shows a block diagram of a base four storage element. A base four to base two converter 4->2, binary flip-flops FF, a base two to base four converter 2->4, and pull up resistors are shown.

An n digit register, FIG. 5, is made up of n base four storage elements, and each base four storage element, FIG. 6, is composed of a base four to base two converter, a base two to base four converter, two flip-flops, and two resistors. The converters are described below. The flip-flops are standard high speed CMOS devices. The resistors are ¼ W, carbon film, 1% resistors. R is typically 1K Ohms, and v1 is typically 5 Volts.

Figure 7:
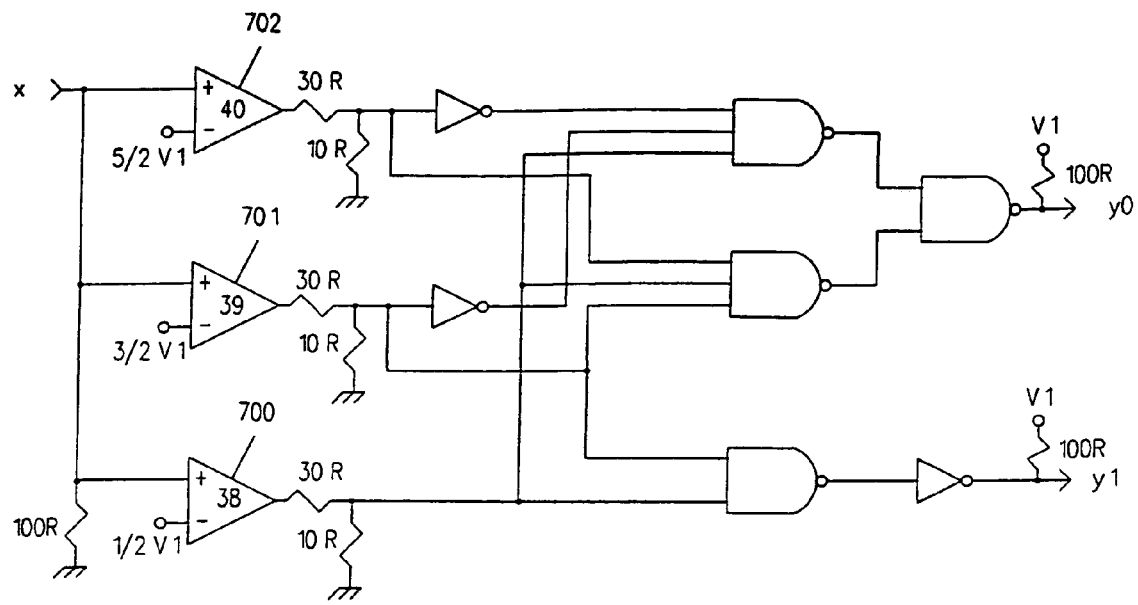
FIG. 7 shows a schematic diagram of a base four to base two converter.

Each base four to base two converter, FIG. 7, is composed of three comparators, four NAND gates, three inverters, and nine resistors. Each comparator is a single supply device whose slew rate is at least 15V/us. Each logic gate is a standard high speed CMOS circuit. Each resistor is a /4 W, carbon film, 1% resistor. R is typically 1K Ohms, and v1 is typically 5 Volts.

Figure 8:
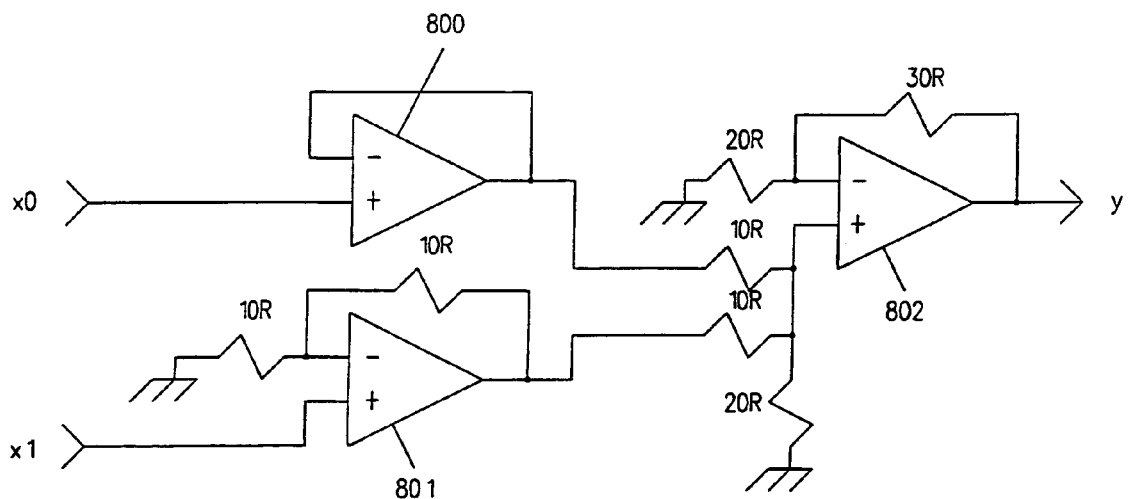
FIG. 8 shows a schematic diagram of a base two to base four converter.

Each base two to base four converter, FIG. 8, is composed of three operational amplifiers and seven resistors. Each op amp is a standard, single supply, device whose slew rate is at least 15V/us, and whose gain-bandwidth product is at least 35 MHz. Each resistor is a ¼ W, carbon film, 1% component. R is typically 1K Ohms.

Figure 9:
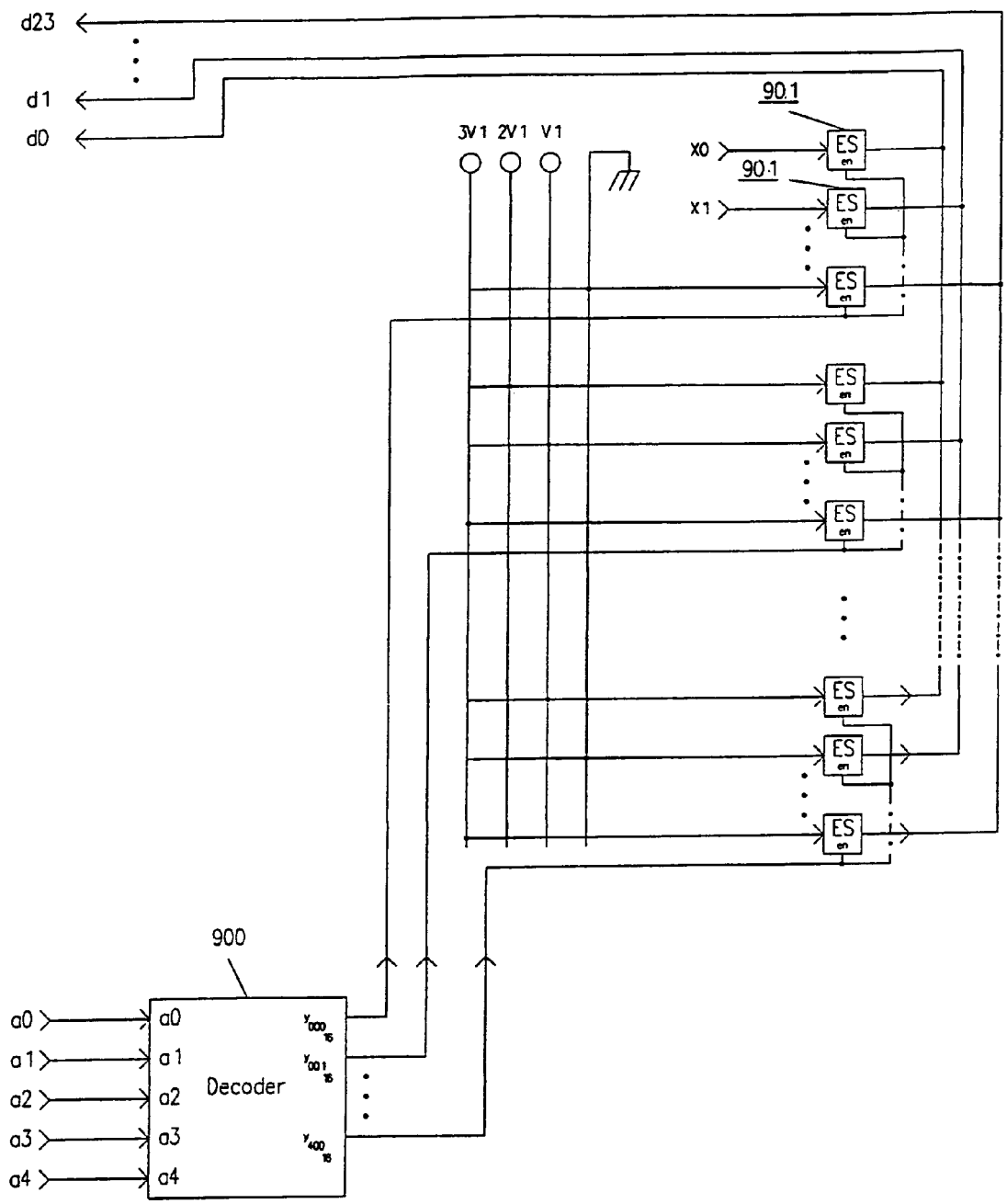
FIG. 9 shows a block diagram of the system controller ROM. A decoder, electronic switches ES and interconnecting wires are shown.

The system controller ROM, FIG. 9, is composed of a wire grid, a decoder, and a plurality of electronic switches. The wire grid is typically constructed on a two layer printed circuit board, and feed through paths are typically used to make the connections. V1 is typically 5 Volts. The decoder and electronic switches are described below.

Figure 10:
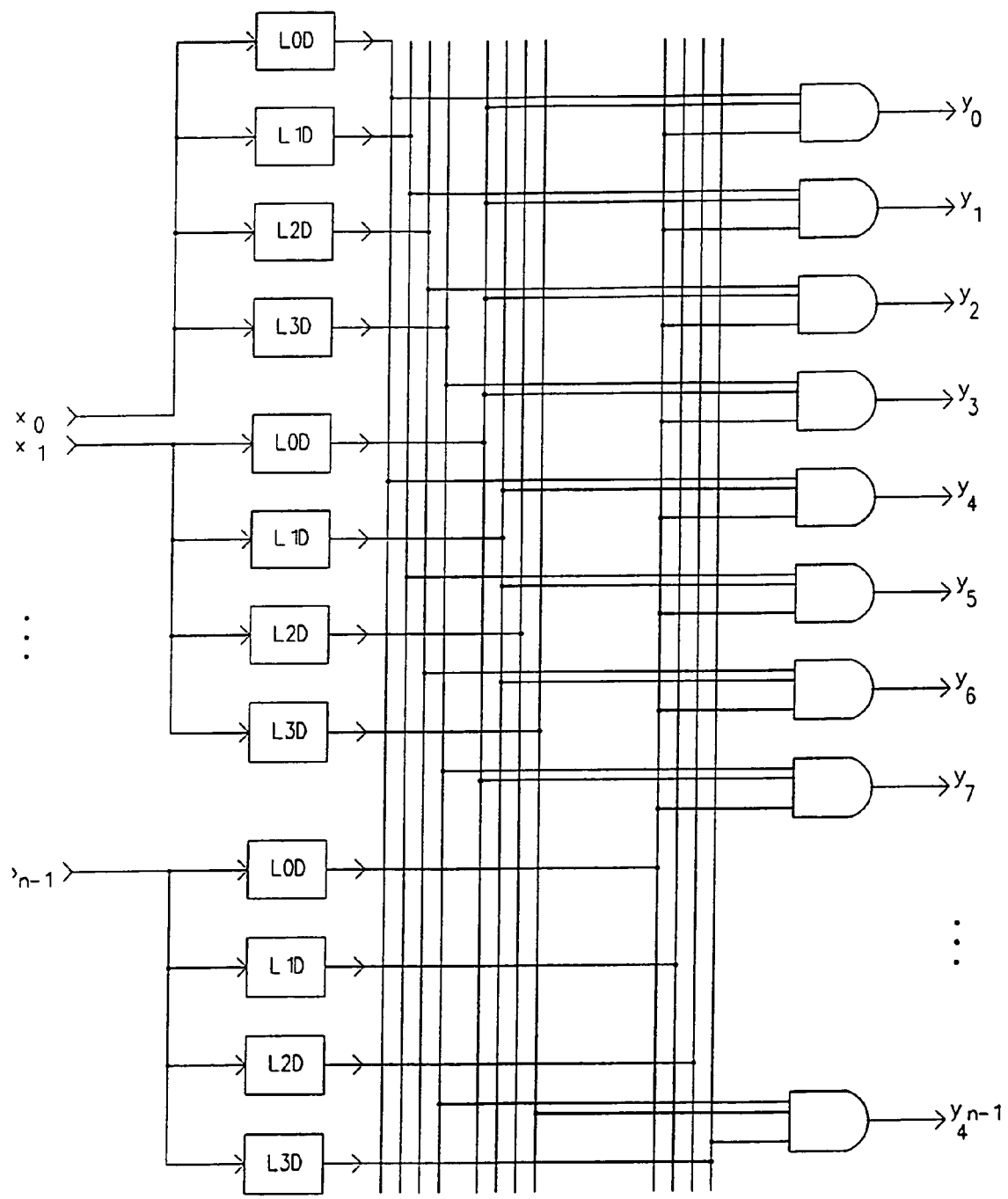
FIG. 10 shows a block diagram of an n to 4^n decoder. Level detectors, logic circuits, and interconnecting wires are shown.
Figure 11:
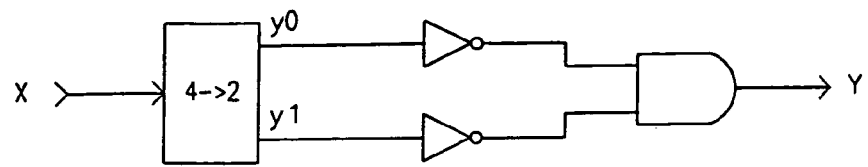
FIGS. 11 through 14 show block diagrams of level zero, one, two, and three detectors respectively.
Figure 12:
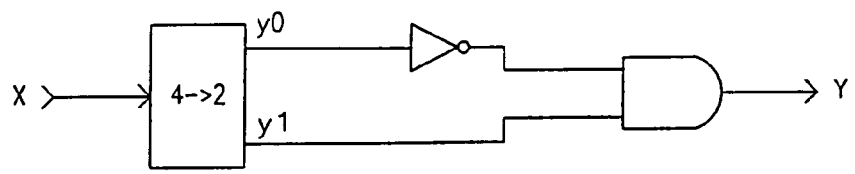
Figure 13:
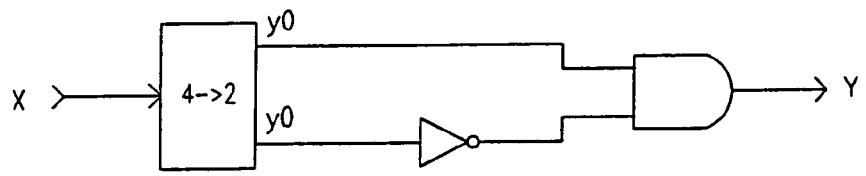
Figure 14:
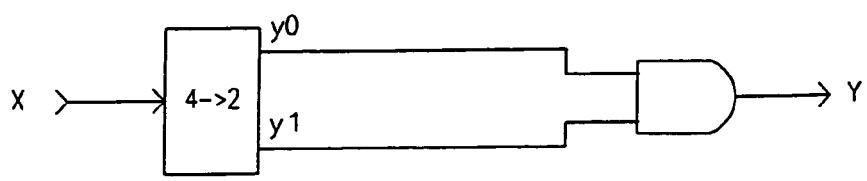

The decoder, FIG. 10, is composed of a wire grid, a plurality of AND gates, and a level detectors. The wire grid is constructed as described previously. The AND gates are standard high speed CMOS devices, and the level detectors are described below.

Each level detector, FIGS. 11-14, is composed of a base four to base two converter, and a plurality of logic gates. The base four to base two converter is constructed as previously described, and the logic gates are standard high speed CMOS devices.

Description—FIGS. 15-33

Figure 15:
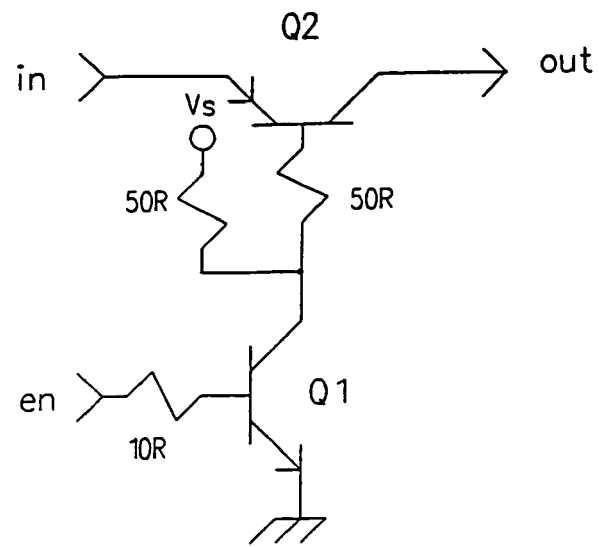
FIG. 15 shows a schematic diagram of an electronic switch.

Each electronic switch, FIG. 15, is composed of three resistors, one PNP transistor, and one NPN transistor. Each resistor is a ¼ W, carbon film, 1% component. R is typically 1K Ohms. Each transistor is a small signal device whose current gain is about 100. Vs is typically 20 Volts.

Figure 16:
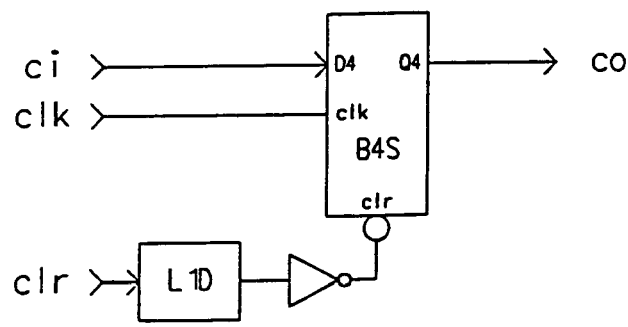
FIG. 16 shows a block diagram of the carry register C.

The carry register, FIG. 16, is composed of a base four storage element, a level detector, and an inverter. The base four storage element, and level detector are constructed as described previously. The inverter is a standard high speed CMOS device.

Figure 17:
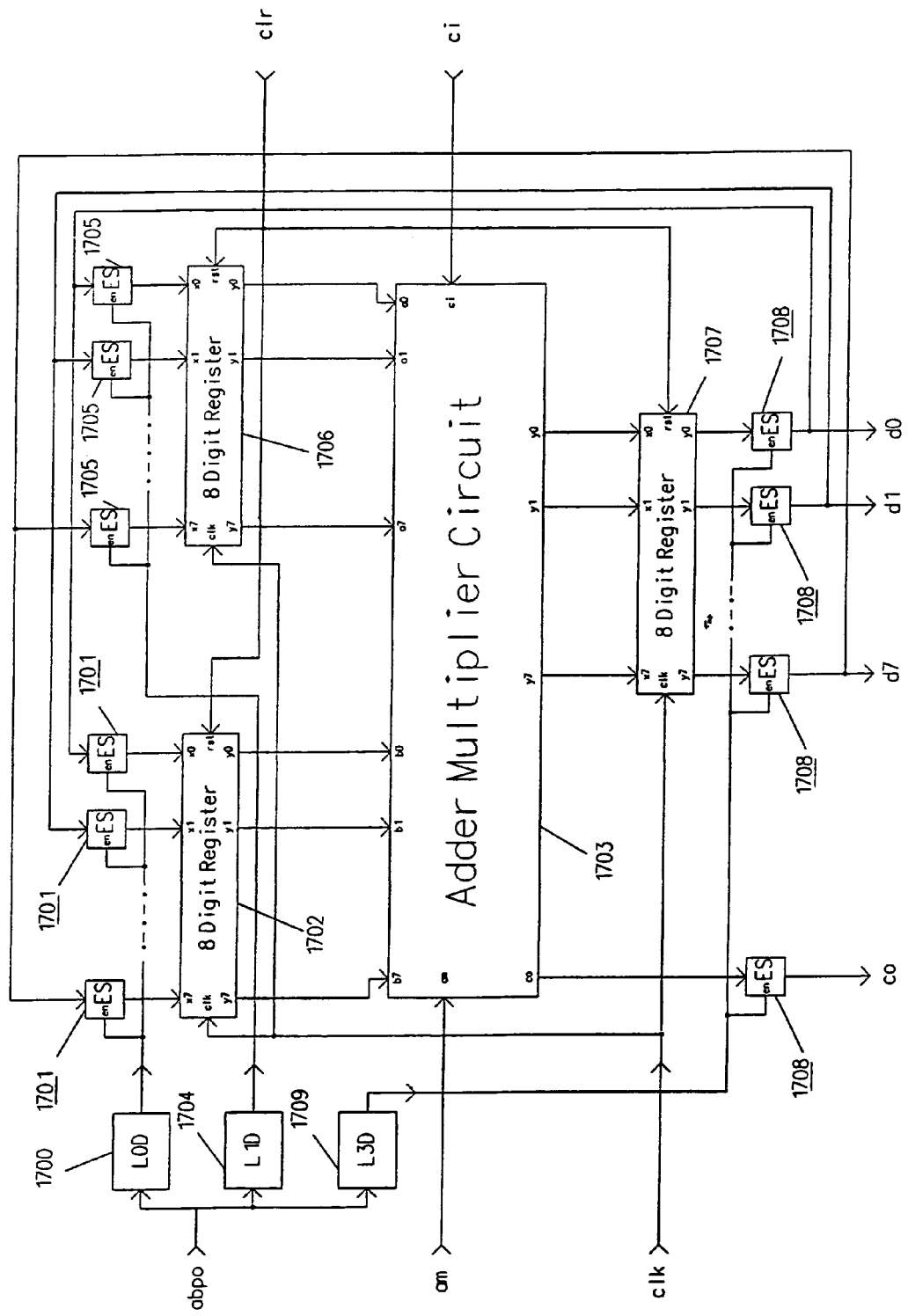
FIG. 17 shows a block diagram of the arithmetic logic unit ALU. Level detectors, electronic switches, base four registers, and an adder multiplier circuit are shown.

The ALU, FIG. 17, is composed of level detectors, eight digit registers, electronic switches, and an adder multiplier circuit. The level detectors, eight digit registers, and electronic switches are constructed as described previously.

Figure 18:
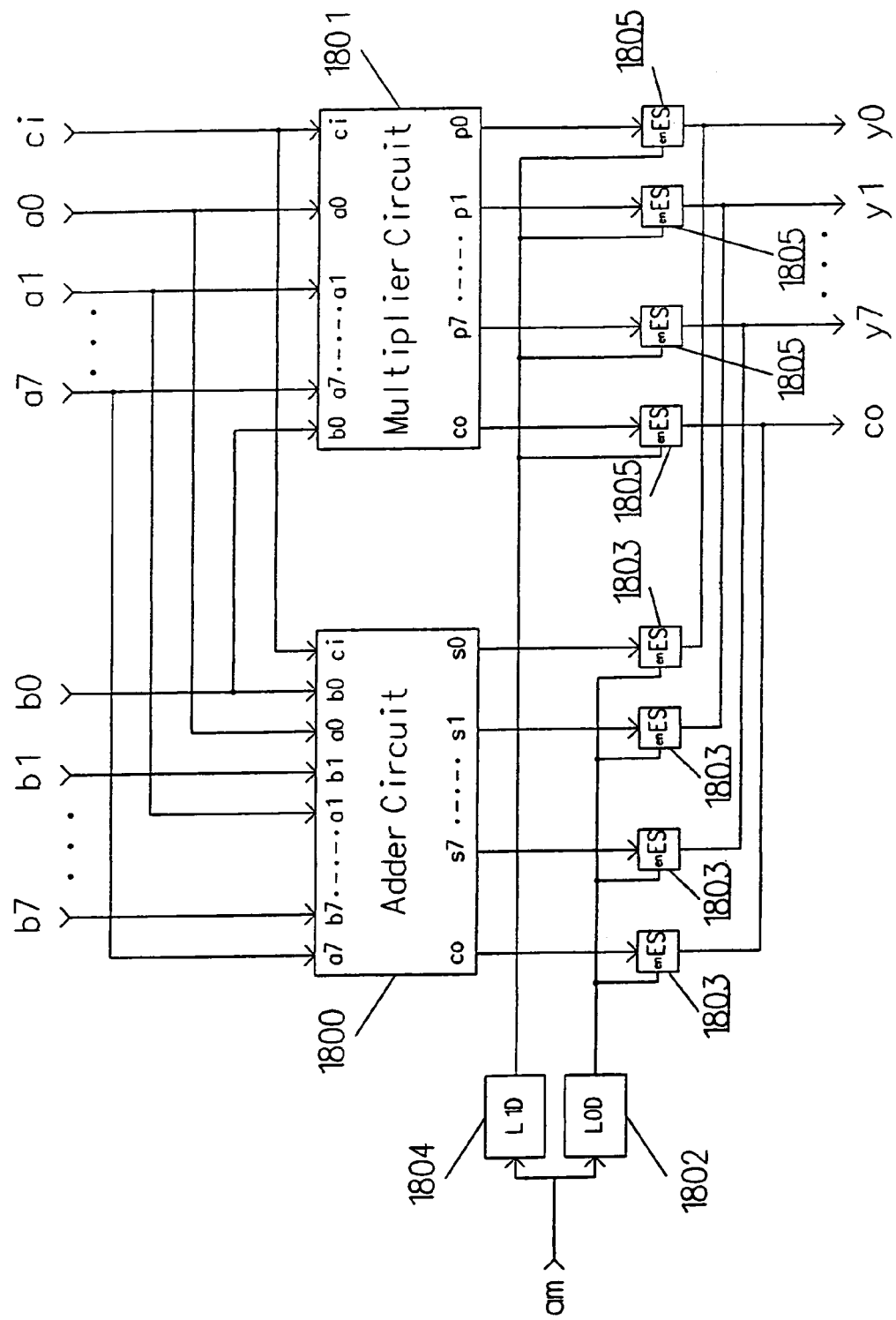
FIG. 18 shows a block diagram of the adder multiplier circuit. Level detectors, electronic switches, an adder circuit, and a multiplier circuit are shown.

The adder multiplier circuit, FIG. 18, is composed of level detectors, electronic switches, an adder circuit, and a multiplier circuit. The level detectors and electronic switches are constructed as described previously.

Figure 19:
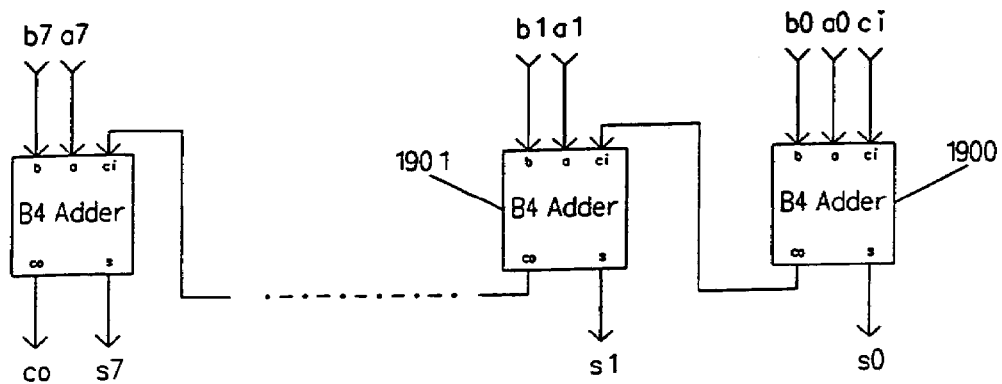
FIG. 19 shows a block diagram of the adder circuit. The base four adders are shown.
Figure 20:
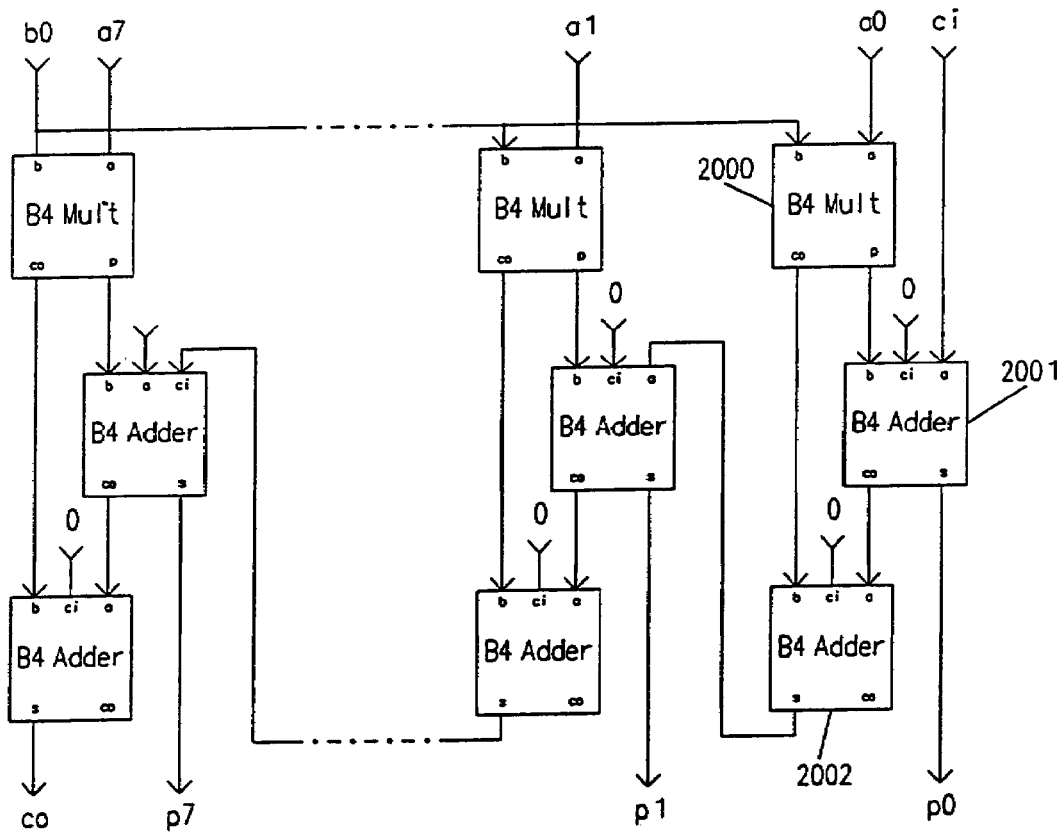
FIG. 20 shows a block diagram of the multiplier circuit. The base four multipliers B4 Mult, and base four adders B4 Adder are shown.

The adder circuit, FIG. 19, is composed of base four adders. The multiplier circuit, FIG. 20, is composed of base four adders, and base four multipliers.

Figure 21:
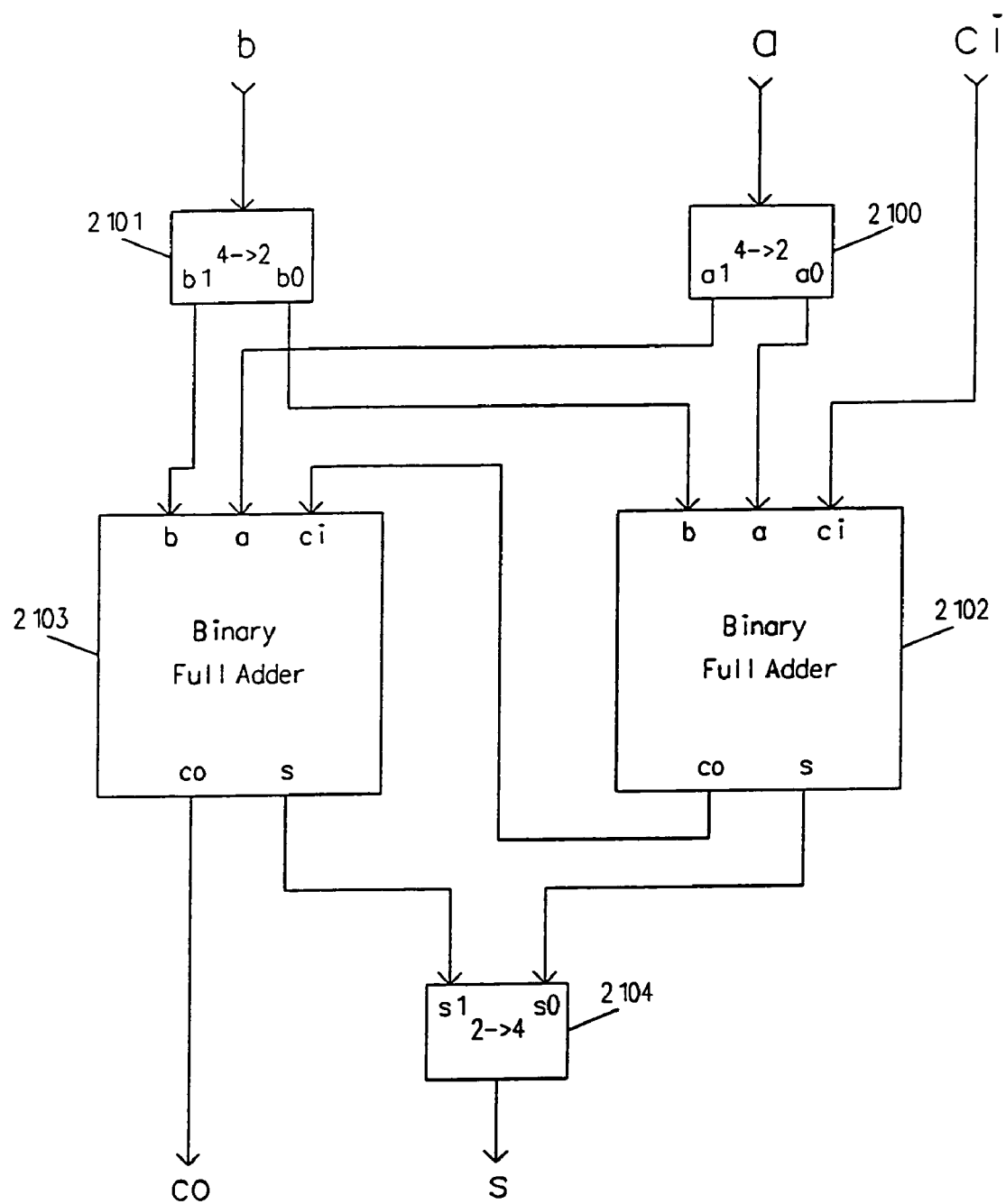
FIG. 21 shows a block diagram of a base four adder.

The base four adder, FIG. 21, is composed of base four to base converters, a base two to base four converters, and binary full adders. The converters are constructed as described previously. The binary full adders are standard high speed CMOS circuits.

Figure 22:
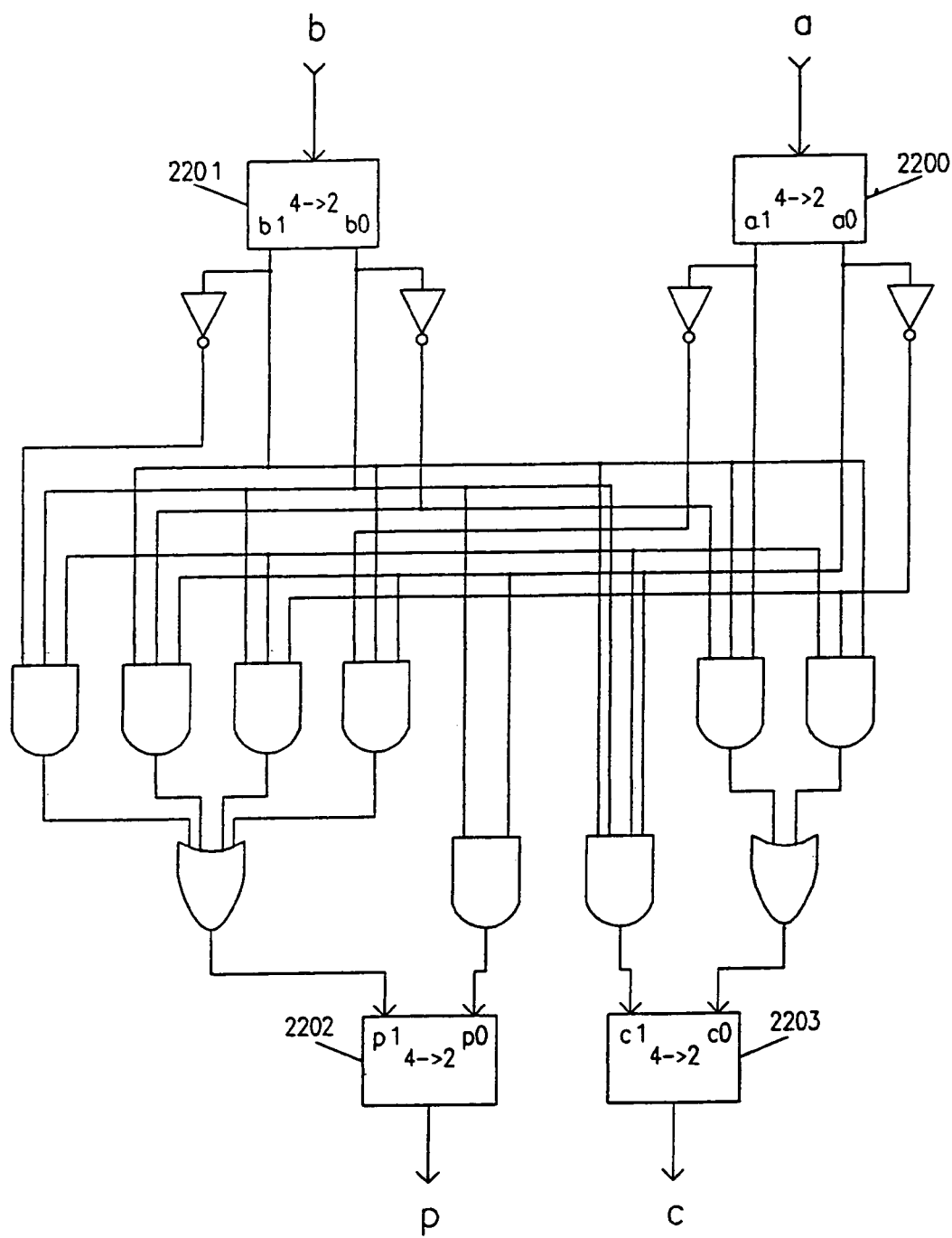
FIG. 22 shows a block diagram of a base four multiplier.

The base four multiplier, FIG. 22, is composed of base four to base two converters, base two to base four converters, and a plurality of logic gates. The converters are constructed as described previously, and the logic gates are standard high speed CMOS circuits.

The circuits shown in FIGS. 23-32 are composed of components that have been described, and each of these components is constructed as described previously.

Figure 33:
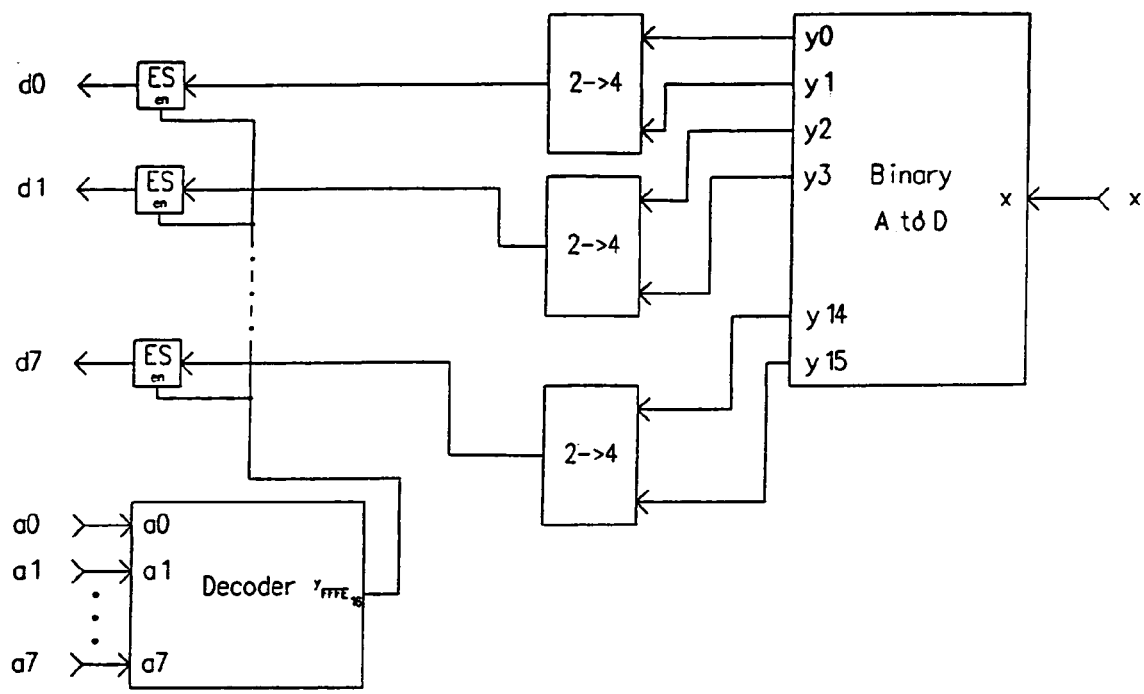
FIG. 33 shows a block diagram of the base four analog to digital converter.

The A to D converter, FIG. 33, is composed of electronic switches, base two to base four converters, a decoder, and a binary A to D converter. The electronic switches, base two to base four converters, and decoder are constructed as described previously. The binary A to D converter is a sixteen bit converter with a conversion rate of at least 20 Msps.

Figure 34:
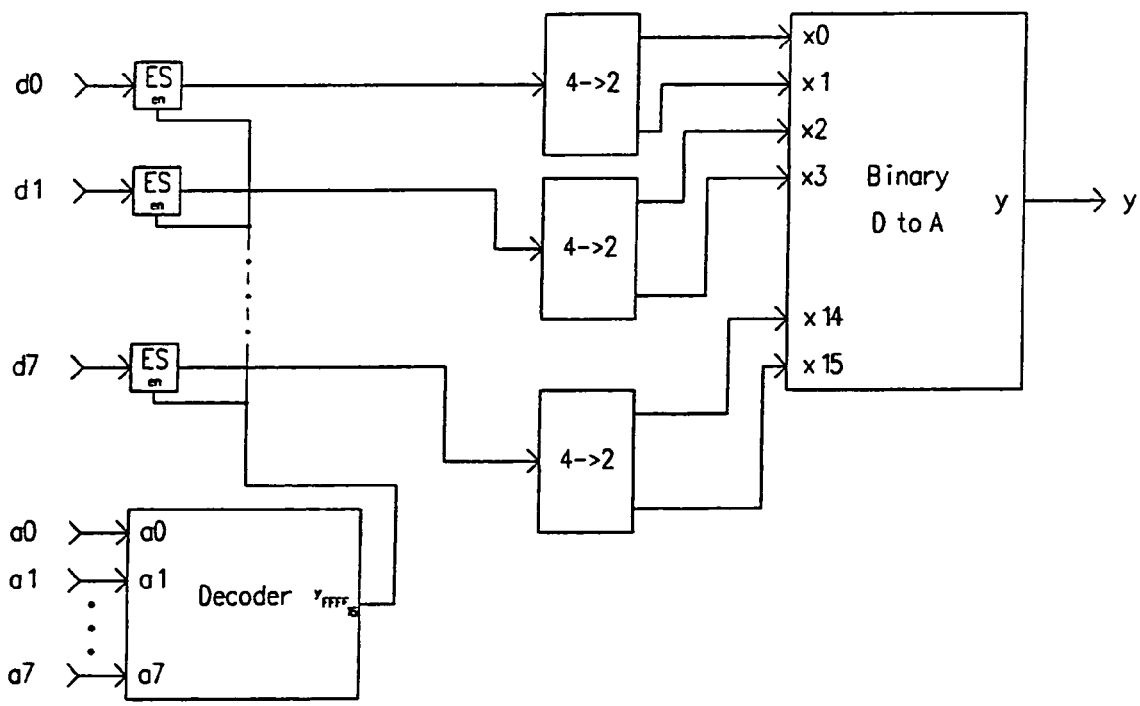
FIG. 34 shows a block diagram of the base four digital to analog converter.
Figure 35:
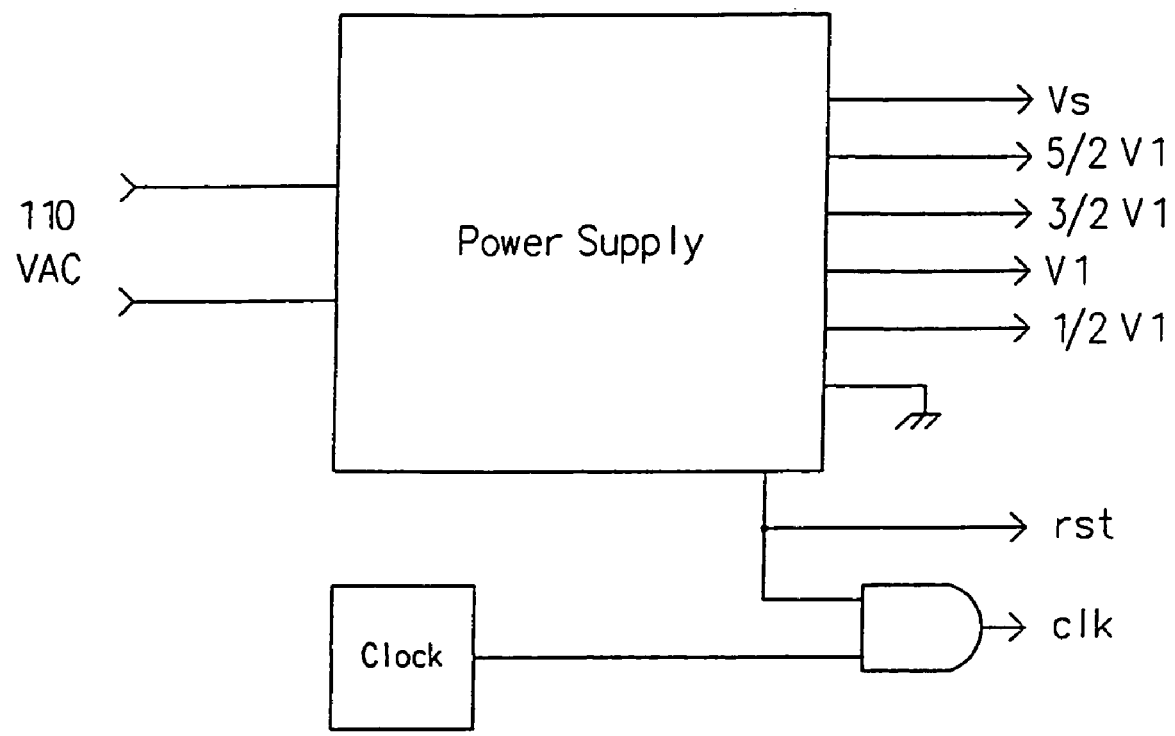
FIG. 35 shows a block diagram of the system power supply circuit.

Description—FIGS. 34-35

The D to A converter, FIG. 34, is composed of electronic switches, base four to base two converters, a decoder, and a binary D to A converter. The electronic switches, base four to base two converters, and decoder are constructed as described previously. The binary D to A converter is a sixteen bit converter with a conversion rate of at least 20 Msps.

The power supply circuit, FIG. 35, is composed of a clock oscillator, an AND gate, and a power supply. The clock oscillator is a standard 1 MHz square wave oscillator. The AND gate is a standard high speed CMOS device.

The power supply is a circuit that converts 110 VAC into five DC voltages, and regulates each of these to within one percent of its nominal value. Vs is typically 20 V, and V1 is typically 5 V. This power supply must be able to supply 50 A to the Vs output, and 10 A to the other four voltage source outputs. The reset output is typically a 5 V CMOS output.

Operation—FIG. 3

A state of the art system does calculations by performing operations on binary digits. The proposed system does calculations by performing operations on base four digits, thereby reducing the number of operations that need to be performed, and thereby reducing the amount of time that is required for the calculation.

This invention consists of a system controller, several busses, a program counter, two switches, an analog to digital converter, a digital to analog converter, RAM, ROM, an arithmetic logic unit, and several registers. A brief description of each of these components is given below. This description is followed by an explanation of how the entire system of components functions, and this explanation is followed by a detailed explanation of how each component and sub component functions.

The busses provide signal paths, so that information may be exchanged, between the various components. Each bus consists of eight conductors. The address bus 300 is unidirectional, and it allows address information to be sent from the program counter to various other components. The data bus 301 is bidirectional, and it allows for data to be exchanged among various components. The intermediate bus 302 is bidirectional, and it allows for information to be exchanged among the address bus, the data bus, the program counter 303, and the P register 306. Arrow heads are used to show the direction of information flow. Bidirectional information flow is indicated by arrow heads that point in both directions.

The program counter 303 is an eight digit register which points to a memory location or to one of the converters. The program counter has three control lines: reset, rst, clock, dk, and input increment, ii. The reset line causes the contents of the PC, and the contents of all other registers, to be set to zero when the reset line has a logic zero state. The clock line causes the program counter's contents to change when the clock line is toggled from a logic zero state to a logic one state. Note that the clock lines to the components are independent of each other and are independent of the system clock. The input increment line determines how the contents is changed when the clock pulse occurs. If the ii line has a logic zero, a logic two, or a logic three state when the clock pulse occurs, the program counter will input data from the intermediate bus. If the ii line has a logic one state, t he PC will be incremented when the clock pulse occurs. The program counter's contents is always placed on the address bus.

The DP switch 304 allows for data to be transferred from the data bus to the PC, and from the P register to the data bus. The DP switch's mode of operation is controlled by its enable, en, line. When the en line has a logic zero state, data can flow from the data bus to the PC.

When the en line has a logic two state, data can flow from the P register to the data bus, and when the en line is in any other state, the DP switch is off. That is, the data bus is effectively disconnected from the intermediate bus.

The PCP switch 305 allows for data to be transferred from the PC to the P register, and from the PC to the data This switch is unidirectional and is on when its en line has either a logic two or a logic three state. The PCP switch is off when its en line has any other state.

The P register 306 is an eight digit register that temporarily holds an address, so that the address may be reloaded into the PC at a later time. The contents of the P register is controlled by the P register's oi and elk lines. The P register is loaded from the intermediate bus when the oi line has a logic two state, and when the P register's clock is toggled from a logic zero state to a logic one state. The P register's contents is placed on the intermediate bus when the oi line has a logic one state. The P register is effectively disconnected from the intermediate bus when the oi line has any other state.

The A register 307, accumulator, is an eight digit register that holds the result of a calculation. This register can either place data on, or receive data from the data bus. This register's action is controlled by the states of its io and clk lines. When the io line has a logic zero state, the accumulator is in the input mode, and the data, that is present on the data bus, will be loaded into the accumulator when the accumulator's clock line is toggled from a logic zero state to a logic one state. Likewise, when the io line has a logic one state, the accumulator is in the output mode, and its contents is placed on the data bus. When the io line is in any other state, the accumulator is effectively disconnected from the data bus.

The C register 308, carry, is a single digit register that holds a carry result of a calculation. This register receives data from either the arithmetic logic unit, ALU, or from one of the shift registers, BS 311 or S 310. Data is input to the carry register when its clock line is toggled from a logic zero state to a logic one state. The contents of this register is always fed to the ALU. The carry register's clr line causes this register's contents to be set to zero when this line has a logic one state. This clr line has no effect when it has any other state.

The ALU 309, arithmetic logic unit is a subsystem that can either add two eight digit, base four, numbers together, or multiply an eight digit, base four, number by a single digit, base four, number.

The ALU is controlled by its control lines: clr, abpo, clk, and am. The clr line causes the arithmetic logic unit's contents to be set to zero when this line has a logic zero state. The clr line has no effect when it has any other state.

The abpo and clk lines control whether the ALU inputs a number, performs an operation, or outputs a result. When the abpo line has a logic zero state, and the clk line toggles from a logic zero to a logic one state, the first number is loaded into the ALU. When the abpo line has a logic one state, and the pulse occurs, the second number is loaded into the ALU. When the abpo line has a logic two state, and the clock pulse occurs, the ALU performs its operation. The type of operation will depend on the state of the am line. If the am line has a logic zero state, an addition will be performed, and if the am line has a logic one state, a multiplication will be performed. When the abpo line has a logic three state, the result of the operation is placed on the data bus.

The S register 310 is an eight digit, base four, shift register. It can shift the digits either right or left. On a right shift, divide by four, operation, the right most digit is shifted into the carry register, and a zero is shifted into the left most digit. On subsequent right shift operations, the right most digit is shifted into the carry register. The former contents of the carry register is lost. Also, a zero is shifted into the left most digit. On a left shift, or multiply by four, operation, the left most digit is shifted into the carry register, and a zero is shifted into the right most digit. On subsequent left shift operations, the left most digit is shifted into the carry register. The former contents of the carry register is lost. Also, a zero is shifted into the right most digit.

The action of the S register is controlled by its irlo and clk lines. When the irlo line has a zero state, and the clk line toggles from a zero state to a one state, the S register loads data from the data bus. When the irlo line has a logic one state, and the clk line toggles from zero to one, the S register performs a right shift operation. When the irlo line has a logic two state, and the clk line toggles from zero to one, the S register performs a left shift operation and when the irlo line has a logic three state, and the clk line toggles from zero to one, the S register outputs data to the data bus.

The BS 311, binary shift, register functions in the same manner as the S register, except that the contents of the BS register is converted to binary before the shift occurs. A right shift operation, therefore, multiplies by two, and a left shift divides by two.

The ROM 312, or read only memory, is a base four memory which permanently stores the instructions which the processor executes. The ROM contains 32768 memory locations, and each location is eight digits wide. The ROM is memory mapped between hex addresses 0000 and 7FFF inclusive. Hexadecimal notation is used for convenience, but the actual address bus is base four. The ROM is enabled when its en line has a logic zero state.

When a ROM location is addressed, and the ROM is enabled, its contents is placed on the data bus. When the ROM's en line has a state other than logic zero, the ROM is disabled, and the ROM is effectively disconnected from the data bus.

The RAM 313, or random access memory, is a base four memory which serves as a scratchpad for the processor. The RAM contains 32766 locations, and each digit is eight digits wide. The RAM is memory mapped between hex addresses 8000 and FFFD inclusive.

The RAM may be read from or written to. The action of the RAM is controlled by its rw and clk lines. When the rw line has a zero logic state, the RAM is in the read mode, so when a location is addressed, its contents is placed on the data bus. When the rw line has a logic one state, the RAM is in the write mode, so when a location is addressed, the contents of the data bus will be written to this location when the clk line toggles from a logic zero state to a logic one state. When a RAM location is not addressed, the RAM is effectively disconnected from the data bus.

The A to D 314, or analog to digital converter converts an analog voltage level to an eight digit base four number. The A to D converter is located at address FFFF, so when this address is placed on the address bus, the eight digit base four number is placed on the data bus.

The D to A 315, or digital to analog converter, converts an eight digit base four number to an analog voltage level. The D to A converter is located at address FFFE, so when this address is placed on the address bus, the contents of the data bus is written to the D to A converter, and is converted to an analog voltage level.

The System Controller 316 controls the operation of the system by setting the states of the control fines to the components. The system controller has several lines input to it. These lines are the reset line, rst, the system clock, clk, and three lines from the data bus, d0, d1, and d2. The actions of the system controller are governed by the states of these lines.

The reset line resets the system controller, as well as all of the other components, when it has a logic zero state. That is, when the reset line has a logic zero state, all of the control lines are forced to, and held at, a logic zero state. When the reset line has a logic one state, the system may function. The reset line is supplied by an external watch dog timer.

The system clock, clk, is a pulsed waveform which toggles between a logic zero state and a logic one state. On each clock cycle, the system controller sets the control lines appropriately. The system clock is supplied by an external crystal oscillator. The data lines supply instructions and data to the system controller, so these lines effectively tell the system controller what to do. The operation of the entire system, and its instruction set, is explained in the following paragraphs.

When the system is initialized, power is applied to the system, and the reset line is held low for a delay time. During the delay, the PC points to the hex address 0000, and the contents of this address is placed on the data bus. This contents is the opcode of the first instruction of the program. The reset line is, then, toggled to a logic one state, and the clock signal is applied to the system. When the clock first toggles from a logic zero state to a logic one state, this opcode is loaded into the system controller. The system controller decodes this opcode, and on subsequent zero to one transitions of the system clock, the system controller sets the control lines to the states necessary to execute the instruction. When the instruction execution is finished, the system controller increments the PC so that it points to the next instruction, and this cycle is repeated.

This system inputs data from the A to D converter, performs calculations, and outputs data to the D to A converter by executing instructions that are stored in memory.

The instruction set for this processor, shown below, consists of eleven instructions, and there are three addressing modes. These instructions, and addressing modes, are discussed in the following paragraphs.

| | Addressing Mode | | | |
|---|---|---|---|---|
| Instruction | Immediate opcode | Direct opcode | Implied opcode | Action |
| LDA | 01 | 02 | | M → A |
| STA | | 03 | | A → M |
| JMP | 10 | 11 | | M → PC |
| JOC | 12 | 13 | | PC + C → PC, M → PC |
| ADA | 20 | 21 | | A + M + C → A, C |
| MUL | 22 | 23 | | A*(m0) → A, C |
| RSA | | | 30 | A/4 → A, C |
| LSA | | | 31 | A*4 → A, C |
| CLC | | | 32 | 0 → C |
| A*2 | | | 33 | A*2 → A, C |
| A/2 | | | 100 | A/2 → A, C |

The first instruction, LDA, is the load accumulator instruction. This instruction copies the contents of a either a memory location, or the A to D converter, to the accumulator, A The A to D converter is at memory location FFFF. When the immediate addressing mode is used, for this or most other instructions, the memory location, that immediately follows that of the opcode, contains the operand, and this location is a ROM location. When the direct addressing mode is used, the memory location, that immediately follows that of the opcode, contains the address of the operand, and this location is a RAM location.

The next instruction, STA, is the store accumulator instruction. This instruction copies the contents of the accumulator to a RAM location. This instruction only has the direct addressing mode, so the memory location, that immediately follows that of the opcode, contains the address of the location where the accumulator's contents will be stored.

The next instruction, JMP, is the jump instruction. This instruction copies the contents of a memory location to the program counter, PC.

The next instruction, JOC, is the jump on carry instruction With this instruction, a jump occurs only if the carry register, C, contains a nonzero value. The PC can jump to one of three branch routines.

When JOC instruction is executed, the following sequence takes place. First, the program counter, PC, is incremented. Next, the contents of the PC is added to the contents of the carry register, and the result is stored in the PC. At this time, the PC is pointing to one of four locations depending on the contents of C. If C contains a zero value, then the PC will be pointing to the location that immediately follows that of the opcode, and this location will contain the address of the next instruction. If C contains a nonzero value, then the PC will point to a memory location which contains the starting address of a branch routine. The contents of the location to which the PC is pointing is then copied to the PC.

The next instruction, ADA, is the add with carry instruction. This instruction adds together the contents of C, the contents of A, and the contents of a memory location. The carry is added to the least significant digits of the other two addends. The result is stored in A and C. When the immediate addressing mode is used for this instruction, the memory location is contained in ROM, and when the direct mode is used, the memory location is contained in RAM.

The next instruction, MUL, is the multiply instruction. This instruction multiplies the contents of A by the least significant digit of a memory location The result is stored in A and C. The memory location is contained either in ROM or RAM depending on whether the addressing mode is immediate or direct respectively.

The next instruction, RSA, is the right shift accumulator instruction This instruction causes each digit of the accumulator to be shifted to the right by one place. The least significant digit is shifted into C, and a zero is shifted into the most significant digit. The effect of a right shift is a division by four with the remainder stored in C. This instruction is performed by the S register. This instruction requires no operand, so only the implied addressing mode may be used.

The next instruction, LSA, is the left shift accumulator instruction This instruction causes each digit of the accumulator to be shifted to the left by one place. The most significant digit is shifted into C, and a zero is shifted into the least significant digit. The effect of a left shift is a multiplication by four with the most significant digit stored in C. This instruction is also performed by the S register.

The next instruction, CLC, is the clear carry instruction. This instruction causes the contents of C to be reset to zero.

The next instruction A*2, is the multiply by two instruction. This instruction causes the contents of the accumulator to be multiplied by two. The result is stored in A and C. The most significant digit is stored in C. This instruction is performed by the BS register.

The last instruction, A/2, is the divide by two instruction. This instruction causes the contents of the accumulator to be divided by two. The result is stored in A and C with the remainder being stored in C. This instruction is, also, performed by the BS register.

A typical program would, first, load the accumulator from the A to D converter. This program would, then, perform a calculation, and store the result in the D to A converter.

Operation—FIG. 4

The instructions that were discussed in the previous section, which are called macro instructions, cause data to be moved around among, and manipulated by, the various components of the system. A detailed explanation of how each component, and subcomponent, fuctions is, now, given in the following paragraphs.

The System Controller, FIG. 4, controls the system by sequentially reading the Data Bus 303 lines d0, d1, d2, and setting the states of the various control lines. The System Controller consists of the SC ROM 400, the SC Data Bus 401, and a 24 Digit Register 402.

The SC ROM is a 24 digit wide 1024 location read only memory. The lines x0, x1, and x2 are connected to lines d0, d1, and d2, respectively, of the data bus 303. These lines are hard wired to the three lower significant digits of location zero of the SC ROM. The remaining digits of this location contain zeros, and the remaining locations of the SC ROM contain numbers which can not be changed. These numbers compose micro code instructions. A micro code instruction consists the address of another micro instruction as well as the desired settings of the control lines. The five least significant digits of a micro instruction contain the address of the next micro instruction to be executed, and the remaining digits contain the desired settings of the control lines. A location is selected by the address lines a0, a1, a2, a3, and a4, and the contents of the selected location is placed on the SC Data Bus.

The SC Data Bus 401 is a 24 digit, unidirectional bus which transfers data from the SC ROM to the input of the 24 Digit Register 402.

The 24 digit register is a base four register. This register is loaded, from the SC Data Bus when the system clock toggles from a logic zero state to a logic one state. The contents of this register is placed on the output lines o0 through o23. Lines o0 through 04 are connected to address lines a0 through a4, respectively, and these lines, are in turn, connected to the SC ROM. The remaining output lines are connected to the control lines.

The System Controller operates as follows. When the system is initially reset, the 24 Digit Register will contain all zeros, and location zero of the SC ROM will be addressed. The contents of Data Bus 303 lines d0, d1, d2 will, therefore be present on the input lines i0, i1, and i2, respectively, of the 24 Digit Register. The remaining input lines contain zeros. When the first clock transition occurs, the contents of the input lines is loaded into the register. The address lines will, then, point to the starting address of the micro code routine which decodes the first macro instruction. The starting address of the micro code routine for a macro instruction is numerically equal to the opcode of the macro instruction. When subsequent clock transitions occur, micro code instructions are copied from the SC ROM to the 24 Digit Register, and the control lines are set to their desired states. When the final micro code instruction is executed, location zero of the SC ROM will again be addressed, and the cycle will be repeated for the next macro instruction. The micro code routine for each macro instruction is given below.

| Micro Code Routine For LDA Immediate | | | | | | | | | | | |
| --- | --- | --- | --- | --- | --- | --- | --- | --- | --- | --- | --- |
| Address | d23 | d22 | d21 | d20 | d19 | d18 | d17 | d16 | d15 | d14 | d13 |
| 00000 | 0 | 0 | 0 | 0 | 0 | 0 | 0 | 0 | 0 | 0 | 0 |
| 00001 | 0 | 0 | 0 | 0 | 0 | 0 | 0 | 0 | 0 | 0 | 0 |
| 00200 | 0 | 0 | 0 | 0 | 0 | 0 | 0 | 0 | 0 | 0 | 0 |

-continued

Micro Code Routine For LDA Immediate

| Address | d23 | d22 | d21 | d20 | d19 | d18 | d17 | d16 | d15 | d14 | d13 |
|---|---|---|---|---|---|---|---|---|---|---|---|
| 00201 | 0 | 1 | 0 | 0 | 0 | 0 | 0 | 0 | 0 | 0 | 0 |
| 00202 | 0 | 0 | 0 | 0 | 0 | 0 | 0 | 0 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 0 | 1 | |
| 00001 | 0 | 0 | 0 | 0 | 0 | 1 | 0 | 0 | 0 | 0 | 2 | 0 | 0 | |
| 00200 | 0 | 0 | 0 | 0 | 0 | 1 | 1 | 0 | 0 | 0 | 2 | 0 | 1 | Inc PC |
| 00201 | 0 | 0 | 0 | 0 | 0 | 1 | 0 | 0 | 0 | 0 | 2 | 0 | 2 | M -> A |
| 00202 | 0 | 0 | 0 | 0 | 0 | 1 | 1 | 0 | 0 | 0 | 0 | 0 | 0 | Inc PC |

Micro Code Routine For LDA Direct

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00002 | 0 | 0 | 0 | 0 | 0 | 0 | 0 | 0 | 0 | 0 | 0 |
| 00220 | 0 | 0 | 0 | 0 | 0 | 0 | 0 | 0 | 0 | 0 | 0 |
| 00221 | 0 | 0 | 0 | 0 | 0 | 0 | 0 | 0 | 0 | 0 | 0 |
| 00222 | 0 | 0 | 0 | 0 | 0 | 0 | 0 | 0 | 0 | 0 | 0 |
| 00223 | 0 | 0 | 0 | 0 | 0 | 0 | 0 | 0 | 0 | 0 | 0 |
| 00230 | 0 | 0 | 0 | 0 | 0 | 0 | 0 | 0 | 0 | 0 | 0 |
| 00231 | 0 | 1 | 0 | 0 | 0 | 0 | 0 | 0 | 0 | 0 | 0 |
| 00232 | 0 | 0 | 0 | 0 | 0 | 0 | 0 | 0 | 0 | 0 | 0 |
| 00233 | 0 | 0 | 0 | 0 | 0 | 0 | 0 | 0 | 0 | 0 | 0 |
| 00300 | 0 | 0 | 0 | 0 | 0 | 0 | 0 | 0 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 0 | 2 | |
| 00002 | 0 | 0 | 0 | 0 | 0 | 1 | 0 | 0 | 0 | 0 | 2 | 2 | 0 | |
| 00220 | 0 | 0 | 0 | 0 | 0 | 1 | 1 | 0 | 0 | 0 | 2 | 2 | 1 | Inc PC |
| 00221 | 0 | 0 | 0 | 0 | 0 | 0 | 0 | 3 | 0 | 0 | 2 | 2 | 2 | |
| 00222 | 0 | 0 | 0 | 0 | 1 | 0 | 0 | 3 | 0 | 0 | 2 | 2 | 3 | PC -> P |
| 00223 | 0 | 0 | 0 | 0 | 0 | 0 | 0 | 0 | 0 | 0 | 2 | 3 | 0 | |
| 00230 | 0 | 1 | 0 | 0 | 0 | 0 | 1 | 0 | 0 | 0 | 2 | 3 | 1 | M -> PC |
| 00231 | 0 | 1 | 0 | 0 | 0 | 0 | 1 | 0 | 0 | 0 | 2 | 3 | 2 | M -> A |
| 00232 | 0 | 0 | 0 | 0 | 0 | 1 | 1 | 0 | 0 | 0 | 2 | 3 | 3 | P -> PC |
| 00233 | 0 | 0 | 0 | 0 | 0 | 1 | 0 | 0 | 0 | 0 | 3 | 0 | 0 | |
| 00300 | 0 | 0 | 0 | 0 | 0 | 1 | 1 | 0 | 0 | 0 | 0 | 0 | 0 | Inc PC |

Micro Code Routine For STA

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00003 | 0 | 0 | 0 | 0 | 0 | 0 | 0 | 0 | 0 | 0 | 0 |
| 00310 | 0 | 0 | 0 | 0 | 0 | 0 | 0 | 0 | 0 | 0 | 0 |
| 00311 | 0 | 0 | 0 | 0 | 0 | 0 | 0 | 0 | 0 | 0 | 0 |
| 00312 | 0 | 0 | 0 | 0 | 0 | 0 | 0 | 0 | 0 | 0 | 0 |
| 00313 | 0 | 0 | 0 | 0 | 0 | 0 | 0 | 0 | 0 | 0 | 0 |
| 00320 | 1 | 0 | 0 | 0 | 0 | 0 | 0 | 0 | 0 | 0 | 0 |
| 00321 | 1 | 0 | 0 | 0 | 0 | 0 | 0 | 0 | 0 | 0 | 0 |
| 00322 | 0 | 0 | 0 | 0 | 0 | 0 | 0 | 0 | 0 | 0 | 0 |
| 00323 | 0 | 0 | 0 | 0 | 0 | 0 | 0 | 0 | 0 | 0 | 0 |
| 00330 | 0 | 0 | 0 | 0 | 0 | 0 | 0 | 0 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 0 | 3 | |
| 00003 | 0 | 0 | 0 | 0 | 0 | 1 | 0 | 0 | 0 | 0 | 3 | 1 | 0 | |
| 00310 | 0 | 0 | 0 | 0 | 0 | 1 | 1 | 0 | 0 | 0 | 3 | 1 | 1 | Inc PC |
| 00311 | 0 | 0 | 0 | 0 | 0 | 0 | 0 | 3 | 0 | 0 | 3 | 1 | 2 | |
| 00312 | 0 | 0 | 0 | 0 | 1 | 0 | 0 | 3 | 0 | 0 | 3 | 1 | 3 | PC -> P |
| 00313 | 0 | 0 | 0 | 0 | 0 | 0 | 0 | 0 | 0 | 0 | 3 | 2 | 0 | |
| 00320 | 0 | 1 | 0 | 1 | 0 | 0 | 1 | 0 | 0 | 0 | 3 | 2 | 1 | M -> PC |

-continued

Micro Code Routine For STA

| 00321 | 0 | 1 | 1 | 1 | 0 | 0 | 0 | 1 | 0 | 0 | 3 | 2 | 2 | A -> M |
| 00322 | 0 | 0 | 0 | 0 | 0 | 0 | 1 | 1 | 0 | 0 | 3 | 2 | 3 | P -> PC |
| 00323 | 0 | 0 | 0 | 0 | 0 | 1 | 0 | 0 | 0 | 0 | 3 | 3 | 0 | |
| 00330 | 0 | 0 | 0 | 0 | 0 | 1 | 1 | 0 | 0 | 0 | 0 | 0 | 0 | Inc PC |

Micro Code Routine For JMP Immediate

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00010 | 0 | 0 | 0 | 0 | 0 | 0 | 0 | 0 | 0 | 0 | 0 |
| 01000 | 0 | 0 | 0 | 0 | 0 | 0 | 0 | 0 | 0 | 0 | 0 |
| 01001 | 0 | 0 | 0 | 0 | 0 | 0 | 0 | 0 | 0 | 0 | 0 |
| 01002 | 0 | 0 | 0 | 0 | 0 | 0 | 0 | 0 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 1 | 0 | |
| 00010 | 0 | 0 | 0 | 0 | 0 | 1 | 0 | 0 | 0 | 1 | 0 | 0 | 0 | |
| 01000 | 0 | 0 | 0 | 0 | 0 | 1 | 1 | 0 | 0 | 1 | 0 | 0 | 1 | Inc PC |
| 01001 | 0 | 0 | 0 | 0 | 0 | 0 | 0 | 0 | 0 | 1 | 0 | 1 | 2 | |
| 01002 | 0 | 0 | 0 | 0 | 0 | 1 | 0 | 0 | 0 | 0 | 0 | 0 | 0 | M -> PC |

Micro Code Routine For JMP Direct

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00011 | 0 | 0 | 0 | 0 | 0 | 0 | 0 | 0 | 0 | 0 | 0 |
| 01010 | 0 | 0 | 0 | 0 | 0 | 0 | 0 | 0 | 0 | 0 | 0 |
| 01011 | 0 | 0 | 0 | 0 | 0 | 0 | 0 | 0 | 0 | 0 | 0 |
| 01012 | 0 | 0 | 0 | 0 | 0 | 0 | 0 | 0 | 0 | 0 | 0 |
| 01013 | 0 | 0 | 0 | 0 | 0 | 0 | 0 | 0 | 0 | 0 | 0 |
| 01020 | 0 | 0 | 0 | 0 | 0 | 0 | 0 | 0 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 1 | 1 | |
| 00011 | 0 | 0 | 0 | 0 | 0 | 1 | 0 | 0 | 0 | 1 | 0 | 1 | 0 | |
| 01010 | 0 | 0 | 0 | 0 | 0 | 1 | 1 | 0 | 0 | 1 | 0 | 1 | 1 | Inc PC |
| 01011 | 0 | 0 | 0 | 0 | 0 | 0 | 0 | 0 | 0 | 1 | 0 | 1 | 2 | |
| 01012 | 0 | 0 | 0 | 0 | 0 | 1 | 0 | 0 | 1 | 0 | 1 | 3 | | M -> PC |
| 01013 | 0 | 0 | 0 | 0 | 0 | 0 | 0 | 0 | 1 | 0 | 2 | 0 | | |
| 01020 | 0 | 0 | 0 | 0 | 0 | 1 | 0 | 0 | 0 | 0 | 0 | 0 | | M -> PC |

Micro Code Routine For JOC Immediate

| Address | d23 | d22 | d21 | d20 | d19 | d18 | d17 | d16 | d15 | d14 | d13 | d12 |
|---|---|---|---|---|---|---|---|---|---|---|---|---|
| 00000 | 0 | 0 | 0 | 0 | 0 | 0 | 0 | 0 | 0 | 0 | 0 | 0 |
| 00012 | 0 | 0 | 0 | 0 | 0 | 0 | 0 | 0 | 0 | 0 | 0 | 0 |
| 01030 | 0 | 0 | 0 | 0 | 0 | 0 | 0 | 0 | 0 | 0 | 0 | 0 |
| 01031 | 0 | 0 | 0 | 0 | 0 | 0 | 0 | 0 | 0 | 0 | 0 | 0 |
| 01032 | 0 | 0 | 0 | 0 | 0 | 1 | 0 | 0 | 0 | 0 | 0 | 0 |
| 01033 | 0 | 0 | 2 | 0 | 0 | 0 | 0 | 0 | 0 | 0 | 0 | 0 |
| 01100 | 0 | 0 | 2 | 0 | 0 | 1 | 0 | 0 | 0 | 0 | 0 | 0 |
| 01101 | 0 | 0 | 3 | 0 | 0 | 0 | 0 | 0 | 0 | 0 | 0 | 0 |
| 01102 | 0 | 0 | 3 | 0 | 0 | 0 | 0 | 0 | 0 | 0 | 0 | 0 |
| 01103 | 0 | 0 | 0 | 0 | 0 | 0 | 0 | 0 | 0 | 0 | 0 | 0 |
| 01110 | 0 | 0 | 0 | 0 | 0 | 0 | 0 | 0 | 0 | 0 | 0 | 0 |

-continued

Micro Code Routine For JOC Immediate

| Address | d11 | d10 | d9 | d8 | d7 | d6 | d5 | d4 | d3 | d2 | d1 | d0 | Action |
|---|---|---|---|---|---|---|---|---|---|---|---|---|---|
| 00000 | 0 | 0 | 0 | 0 | 0 | 0 | 0 | 0 | 0 | 0 | 1 | 2 | |
| 00012 | 0 | 0 | 0 | 0 | 1 | 0 | 0 | 0 | 1 | 0 | 3 | 0 | |
| 01030 | 1 | 0 | 0 | 0 | 1 | 1 | 0 | 0 | 1 | 0 | 3 | 1 | Inc PC |
| 01031 | 1 | 0 | 0 | 0 | 0 | 0 | 2 | 0 | 1 | 0 | 3 | 2 | |
| 01032 | 1 | 0 | 0 | 0 | 0 | 0 | 2 | 0 | 1 | 0 | 3 | 3 | PC -> ALU |
| 01033 | 1 | 0 | 0 | 0 | 0 | 0 | 0 | 0 | 1 | 1 | 0 | 0 | |
| 01100 | 1 | 0 | 0 | 0 | 0 | 0 | 0 | 0 | 1 | 1 | 0 | 1 | PC + C -> ALU |
| 01101 | 1 | 0 | 0 | 0 | 0 | 0 | 0 | 0 | 1 | 1 | 0 | 2 | |
| 01102 | 1 | 0 | 0 | 0 | 0 | 1 | 0 | 0 | 1 | 1 | 0 | 3 | ALU -> PC |
| 01103 | 0 | 0 | 0 | 0 | 0 | 0 | 0 | 0 | 1 | 1 | 1 | 0 | |
| 01110 | 0 | 0 | 0 | 0 | 0 | 1 | 0 | 0 | 0 | 0 | 0 | 0 | M -> PC |

Micro Code Routine For ADA Direct

| Address | d23 | d22 | d21 | d20 | d19 | d18 | d17 | d16 | d15 | d14 | d13 | d12 |
|---|---|---|---|---|---|---|---|---|---|---|---|---|
| 00000 | 0 | 0 | 0 | 0 | 0 | 0 | 0 | 0 | 0 | 0 | 0 | 0 |
| 00021 | 0 | 0 | 0 | 0 | 0 | 0 | 0 | 0 | 0 | 0 | 0 | 0 |
| 01233 | 0 | 0 | 0 | 0 | 0 | 0 | 0 | 0 | 0 | 0 | 0 | 0 |
| 01300 | 0 | 0 | 0 | 0 | 0 | 0 | 0 | 0 | 0 | 0 | 0 | 0 |
| 01301 | 0 | 0 | 0 | 0 | 0 | 0 | 0 | 0 | 0 | 0 | 0 | 0 |
| 01302 | 0 | 0 | 0 | 0 | 0 | 0 | 0 | 0 | 0 | 0 | 0 | 0 |
| 01303 | 0 | 0 | 0 | 0 | 0 | 0 | 0 | 0 | 0 | 0 | 0 | 0 |
| 01310 | 0 | 0 | 0 | 0 | 0 | 0 | 0 | 0 | 0 | 0 | 0 | 0 |
| 01311 | 0 | 0 | 0 | 0 | 0 | 0 | 0 | 0 | 0 | 0 | 0 | 0 |
| 01312 | 0 | 0 | 0 | 0 | 0 | 1 | 0 | 0 | 0 | 0 | 0 | 0 |
| 01313 | 1 | 0 | 1 | 0 | 0 | 0 | 0 | 0 | 0 | 0 | 0 | 0 |
| 01320 | 1 | 0 | 1 | 0 | 0 | 1 | 0 | 0 | 0 | 0 | 0 | 0 |
| 01321 | 0 | 0 | 2 | 0 | 0 | 0 | 0 | 0 | 0 | 0 | 0 | 0 |
| 01322 | 0 | 0 | 2 | 0 | 0 | 1 | 0 | 0 | 0 | 0 | 0 | 0 |
| 01323 | 0 | 0 | 3 | 0 | 0 | 0 | 0 | 0 | 0 | 0 | 0 | 0 |
| 01330 | 0 | 1 | 3 | 0 | 0 | 0 | 1 | 0 | 0 | 0 | 0 | 0 |
| 01331 | 0 | 0 | 0 | 0 | 0 | 0 | 0 | 0 | 0 | 0 | 0 | 0 |
| 01332 | 0 | 0 | 0 | 0 | 0 | 0 | 0 | 0 | 0 | 0 | 0 | 0 |
| 01333 | 0 | 0 | 0 | 0 | 0 | 0 | 0 | 0 | 0 | 0 | 0 | 0 |

| Address | d11 | d10 | d9 | d8 | d7 | d6 | d5 | d4 | d3 | d2 | d1 | d0 | Action |
|---|---|---|---|---|---|---|---|---|---|---|---|---|---|
| 00000 | 0 | 0 | 0 | 0 | 0 | 0 | 0 | 0 | 0 | 0 | 2 | 1 | |
| 00021 | 0 | 0 | 0 | 0 | 1 | 0 | 0 | 0 | 1 | 2 | 3 | 3 | |
| 01233 | 0 | 0 | 0 | 0 | 1 | 1 | 0 | 0 | 1 | 3 | 0 | 0 | Inc PC |
| 01300 | 0 | 0 | 0 | 0 | 0 | 0 | 3 | 0 | 1 | 3 | 0 | 1 | |
| 01301 | 0 | 0 | 0 | 1 | 0 | 0 | 3 | 0 | 1 | 3 | 0 | 2 | PC -> P |
| 01302 | 0 | 0 | 0 | 0 | 0 | 0 | 0 | 0 | 1 | 3 | 0 | 3 | |
| 01303 | 0 | 0 | 0 | 0 | 0 | 1 | 0 | 0 | 1 | 3 | 1 | 0 | M -> PC |
| 01310 | 0 | 0 | 0 | 0 | 0 | 0 | 0 | 0 | 1 | 3 | 1 | 1 | |
| 01311 | 0 | 0 | 0 | 0 | 0 | 1 | 0 | 0 | 1 | 3 | 1 | 2 | M -> PC |
| 01312 | 0 | 0 | 0 | 0 | 0 | 0 | 0 | 0 | 1 | 3 | 1 | 3 | M -> ALU |
| 01313 | 1 | 0 | 0 | 0 | 0 | 0 | 0 | 0 | 1 | 3 | 2 | 0 | |
| 01320 | 1 | 0 | 0 | 0 | 0 | 0 | 0 | 0 | 1 | 3 | 2 | 1 | A -> ALU |
| 01321 | 1 | 0 | 0 | 0 | 0 | 0 | 0 | 0 | 1 | 3 | 2 | 2 | |
| 01322 | 1 | 0 | 0 | 0 | 0 | 0 | 0 | 0 | 1 | 3 | 2 | 3 | A + M -> ALU |
| 01323 | 1 | 0 | 0 | 0 | 0 | 0 | 0 | 0 | 1 | 3 | 3 | 0 | |
| 01330 | 1 | 0 | 0 | 0 | 0 | 1 | 0 | 0 | 1 | 3 | 3 | 1 | ALU -> A, C |
| 01331 | 1 | 0 | 0 | 0 | 0 | 1 | 1 | 0 | 1 | 3 | 3 | 2 | P -> PC |
| 01332 | 0 | 0 | 0 | 0 | 1 | 0 | 0 | 0 | 1 | 3 | 3 | 3 | |
| 01333 | 0 | 0 | 0 | 0 | 1 | 1 | 0 | 0 | 0 | 0 | 0 | 0 | Inc PC |

Micro Code Routine For MUL Immediate

| Address | d23 | d22 | d21 | d20 | d19 | d18 | d17 | d16 | d15 | d14 | d13 | d12 |
|---|---|---|---|---|---|---|---|---|---|---|---|---|
| 00000 | 0 | 0 | 0 | 0 | 0 | 0 | 0 | 0 | 0 | 0 | 0 | 0 |
| 00022 | 0 | 0 | 0 | 0 | 0 | 0 | 0 | 0 | 0 | 0 | 0 | 0 |
| 02010 | 0 | 0 | 0 | 0 | 0 | 0 | 0 | 0 | 0 | 0 | 0 | 0 |
| 02011 | 0 | 0 | 0 | 0 | 0 | 1 | 0 | 0 | 0 | 0 | 0 | 0 |

-continued

Micro Code Routine For MUL Immediate

| 02012 | 1 | 0 | 1 | 0 | 0 | 0 | 0 | 0 | 0 | 0 | 0 | 0 |
| 02013 | 1 | 0 | 1 | 0 | 0 | 1 | 0 | 0 | 0 | 0 | 0 | 0 |
| 02020 | 0 | 0 | 2 | 0 | 1 | 0 | 0 | 0 | 0 | 0 | 0 | 0 |
| 02021 | 0 | 0 | 2 | 0 | 1 | 1 | 0 | 0 | 0 | 0 | 0 | 0 |
| 02022 | 0 | 0 | 3 | 0 | 0 | 0 | 0 | 0 | 0 | 0 | 0 | 0 |
| 02023 | 0 | 1 | 3 | 0 | 0 | 0 | 1 | 0 | 0 | 0 | 0 | 0 |
| 02030 | 0 | 0 | 0 | 0 | 0 | 0 | 0 | 0 | 0 | 0 | 0 | 0 |

| Address | d11 | d10 | d9 | d8 | d7 | d6 | d5 | d4 | d3 | d2 | d1 | d0 | Action |
|---|---|---|---|---|---|---|---|---|---|---|---|---|---|
| 00000 | 0 | 0 | 0 | 0 | 0 | 0 | 0 | 0 | 0 | 0 | 2 | 2 | |
| 00022 | 0 | 0 | 0 | 0 | 1 | 0 | 0 | 0 | 2 | 0 | 1 | 0 | |
| 02010 | 0 | 0 | 0 | 0 | 1 | 1 | 0 | 0 | 2 | 0 | 1 | 1 | Inc PC |
| 02011 | 0 | 0 | 0 | 0 | 1 | 0 | 0 | 0 | 2 | 0 | 1 | 2 | M -> ALU |
| 02012 | 1 | 0 | 0 | 0 | 1 | 0 | 0 | 0 | 2 | 0 | 1 | 3 | |
| 02013 | 1 | 0 | 0 | 0 | 1 | 0 | 0 | 0 | 2 | 0 | 2 | 0 | A -> ALU |
| 02020 | 1 | 0 | 0 | 0 | 1 | 0 | 0 | 0 | 2 | 0 | 2 | 1 | |
| 02021 | 1 | 0 | 0 | 0 | 1 | 0 | 0 | 0 | 2 | 0 | 2 | 2 | A * m0 -> ALU |
| 02022 | 1 | 0 | 0 | 0 | 1 | 0 | 0 | 0 | 2 | 0 | 2 | 3 | |
| 02023 | 1 | 0 | 0 | 0 | 1 | 0 | 0 | 0 | 2 | 0 | 3 | 0 | ALU -> A, C |
| 02030 | 0 | 0 | 0 | 0 | 1 | 1 | 0 | 0 | 0 | 0 | 0 | 0 | Inc PC |

Micro Code Routine For MUL Direct

| Address | d23 | d22 | d21 | d20 | d19 | d18 | d17 | d16 | d15 | d14 | d13 | d12 |
|---|---|---|---|---|---|---|---|---|---|---|---|---|
| 00000 | 0 | 0 | 0 | 0 | 0 | 0 | 0 | 0 | 0 | 0 | 0 | 0 |
| 00023 | 0 | 0 | 0 | 0 | 0 | 0 | 0 | 0 | 0 | 0 | 0 | 0 |
| 02100 | 0 | 0 | 0 | 0 | 0 | 0 | 0 | 0 | 0 | 0 | 0 | 0 |
| 02101 | 0 | 0 | 0 | 0 | 0 | 0 | 0 | 0 | 0 | 0 | 0 | 0 |
| 02102 | 0 | 0 | 0 | 0 | 0 | 0 | 0 | 0 | 0 | 0 | 0 | 0 |
| 02103 | 0 | 0 | 0 | 0 | 0 | 0 | 0 | 0 | 0 | 0 | 0 | 0 |
| 02110 | 0 | 0 | 0 | 0 | 0 | 0 | 0 | 0 | 0 | 0 | 0 | 0 |
| 02111 | 0 | 0 | 0 | 0 | 0 | 0 | 0 | 0 | 0 | 0 | 0 | 0 |
| 02112 | 0 | 0 | 0 | 0 | 0 | 0 | 0 | 0 | 0 | 0 | 0 | 0 |
| 02113 | 0 | 0 | 0 | 0 | 0 | 1 | 0 | 0 | 0 | 0 | 0 | 0 |
| 02120 | 1 | 0 | 1 | 0 | 0 | 0 | 0 | 0 | 0 | 0 | 0 | 0 |
| 02121 | 1 | 0 | 1 | 0 | 0 | 1 | 0 | 0 | 0 | 0 | 0 | 0 |
| 02122 | 0 | 0 | 2 | 0 | 1 | 0 | 0 | 0 | 0 | 0 | 0 | 0 |
| 02123 | 0 | 0 | 2 | 0 | 1 | 1 | 0 | 0 | 0 | 0 | 0 | 0 |
| 02130 | 0 | 0 | 3 | 0 | 0 | 0 | 0 | 0 | 0 | 0 | 0 | 0 |
| 02131 | 0 | 1 | 3 | 0 | 0 | 0 | 1 | 0 | 0 | 0 | 0 | 0 |
| 02132 | 0 | 0 | 0 | 0 | 0 | 0 | 0 | 0 | 0 | 0 | 0 | 0 |
| 02133 | 0 | 0 | 0 | 0 | 0 | 0 | 0 | 0 | 0 | 0 | 0 | 0 |
| 02200 | 0 | 0 | 0 | 0 | 0 | 0 | 0 | 0 | 0 | 0 | 0 | 0 |

| Address | d11 | d10 | d9 | d8 | d7 | d6 | d5 | d4 | d3 | d2 | d1 | d0 | Action |
|---|---|---|---|---|---|---|---|---|---|---|---|---|---|
| 00000 | 0 | 0 | 0 | 0 | 0 | 0 | 0 | 0 | 0 | 0 | 2 | 3 | |
| 00023 | 0 | 0 | 0 | 0 | 1 | 0 | 0 | 0 | 2 | 1 | 0 | 0 | |
| 02100 | 0 | 0 | 0 | 0 | 1 | 1 | 0 | 0 | 2 | 1 | 0 | 1 | Inc PC |
| 02101 | 0 | 0 | 0 | 0 | 0 | 0 | 3 | 0 | 2 | 1 | 0 | 2 | |
| 02102 | 0 | 0 | 0 | 1 | 0 | 0 | 3 | 0 | 2 | 1 | 0 | 3 | PC -> P |
| 02103 | 0 | 0 | 0 | 0 | 0 | 0 | 0 | 0 | 2 | 1 | 1 | 0 | |
| 02110 | 0 | 0 | 0 | 0 | 0 | 1 | 0 | 0 | 2 | 1 | 1 | 1 | M -> PC |
| 02111 | 0 | 0 | 0 | 0 | 0 | 0 | 0 | 0 | 2 | 1 | 1 | 2 | |
| 02112 | 0 | 0 | 0 | 0 | 0 | 1 | 0 | 0 | 2 | 1 | 1 | 3 | M -> PC |
| 02113 | 0 | 0 | 0 | 0 | 0 | 0 | 0 | 0 | 2 | 1 | 2 | 0 | M -> ALU |
| 02120 | 1 | 0 | 0 | 0 | 0 | 0 | 0 | 0 | 2 | 1 | 2 | 1 | |
| 02121 | 1 | 0 | 0 | 0 | 0 | 0 | 0 | 0 | 2 | 1 | 2 | 2 | A -> ALU |
| 02122 | 1 | 0 | 0 | 0 | 0 | 0 | 0 | 0 | 2 | 1 | 2 | 3 | |
| 02123 | 1 | 0 | 0 | 0 | 0 | 0 | 0 | 0 | 2 | 1 | 3 | 0 | A * m0 -> ALU |
| 02130 | 1 | 0 | 0 | 0 | 0 | 0 | 0 | 0 | 2 | 1 | 3 | 1 | |
| 02131 | 1 | 0 | 0 | 0 | 0 | 0 | 1 | 0 | 2 | 1 | 3 | 2 | ALU -> A, C |
| 02132 | 1 | 0 | 0 | 0 | 0 | 1 | 1 | 0 | 2 | 1 | 3 | 3 | P -> PC |
| 02133 | 0 | 0 | 0 | 0 | 1 | 0 | 0 | 0 | 2 | 2 | 0 | 0 | |
| 02200 | 0 | 0 | 0 | 0 | 1 | 1 | 0 | 0 | 0 | 0 | 0 | 0 | Inc PC |

Micro Code Routine For RSA

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00030 | 0 | 0 | 0 | 0 | 0 | 0 | 0 | 0 | 0 | 0 | 0 |
| 02110 | 1 | 0 | 0 | 0 | 0 | 0 | 0 | 0 | 0 | 0 | 0 |
| 02211 | 1 | 0 | 0 | 0 | 0 | 0 | 0 | 0 | 0 | 0 | 0 |
| 02212 | 0 | 0 | 0 | 0 | 0 | 0 | 0 | 0 | 0 | 0 | 1 |
| 02213 | 0 | 0 | 0 | 0 | 0 | 0 | 1 | 0 | 0 | 0 | 1 |
| 02220 | 0 | 0 | 0 | 0 | 0 | 0 | 0 | 0 | 0 | 0 | 3 |
| 02221 | 0 | 1 | 0 | 0 | 0 | 0 | 0 | 0 | 0 | 0 | 3 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 3 | 0 | |
| 00030 | 0 | 0 | 0 | 0 | 0 | 1 | 0 | 0 | 0 | 2 | 2 | 1 | 0 | |
| 02110 | 0 | 1 | 0 | 0 | 0 | 1 | 1 | 0 | 0 | 2 | 2 | 1 | 1 | Inc PC |
| 02211 | 1 | 1 | 0 | 0 | 0 | 0 | 0 | 0 | 0 | 2 | 2 | 1 | 2 | A -> S |
| 02212 | 0 | 1 | 0 | 0 | 0 | 0 | 0 | 0 | 0 | 2 | 2 | 1 | 3 | |
| 02213 | 1 | 1 | 0 | 0 | 0 | 0 | 0 | 0 | 0 | 2 | 2 | 2 | 0 | RSA |
| 02220 | 0 | 1 | 0 | 0 | 0 | 0 | 0 | 0 | 0 | 2 | 2 | 2 | 1 | |
| 02221 | 0 | 1 | 0 | 0 | 0 | 0 | 0 | 0 | 0 | 0 | 0 | 0 | 0 | S -> A |

Micro Code Routine For LSA

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00031 | 0 | 0 | 0 | 0 | 0 | 0 | 0 | 0 | 0 | 0 | 0 |
| 02130 | 1 | 0 | 0 | 0 | 0 | 0 | 0 | 0 | 0 | 0 | 0 |
| 02231 | 1 | 0 | 0 | 0 | 0 | 0 | 0 | 0 | 0 | 0 | 0 |
| 02232 | 0 | 0 | 0 | 0 | 0 | 0 | 0 | 0 | 0 | 0 | 2 |
| 02233 | 0 | 0 | 0 | 0 | 0 | 0 | 1 | 0 | 0 | 0 | 2 |
| 02300 | 0 | 0 | 0 | 0 | 0 | 0 | 0 | 0 | 0 | 0 | 3 |
| 02301 | 0 | 1 | 0 | 0 | 0 | 0 | 0 | 0 | 0 | 0 | 3 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 3 | 1 | |
| 00031 | 0 | 0 | 0 | 0 | 0 | 1 | 0 | 0 | 0 | 2 | 2 | 3 | 0 | |
| 02130 | 0 | 1 | 0 | 0 | 0 | 1 | 1 | 0 | 0 | 2 | 2 | 3 | 1 | Inc PC |
| 02231 | 1 | 1 | 0 | 0 | 0 | 0 | 0 | 0 | 0 | 2 | 2 | 3 | 2 | A -> S |
| 02232 | 0 | 1 | 0 | 0 | 0 | 0 | 0 | 0 | 0 | 2 | 2 | 3 | 3 | |
| 02233 | 1 | 1 | 0 | 0 | 0 | 0 | 0 | 0 | 0 | 2 | 3 | 0 | 0 | LSA |
| 02300 | 0 | 1 | 0 | 0 | 0 | 0 | 0 | 0 | 0 | 2 | 3 | 0 | 1 | |
| 02301 | 0 | 1 | 0 | 0 | 0 | 0 | 0 | 0 | 0 | 0 | 0 | 0 | 0 | S -> A |

Micro Code Routine For CLC

| Address | d23 | d22 | d21 | d20 | d19 | d18 | d17 | d16 | d15 | d14 | d13 |
|---|---|---|---|---|---|---|---|---|---|---|---|
| 00000 | 0 | 0 | 0 | 0 | 0 | 0 | 0 | 0 | 0 | 0 | 0 |
| 00032 | 0 | 0 | 0 | 0 | 0 | 0 | 0 | 0 | 0 | 0 | 0 |
| 02310 | 0 | 0 | 0 | 0 | 0 | 0 | 0 | 0 | 0 | 0 | 0 |
| 02311 | 0 | 0 | 0 | 0 | 0 | 0 | 0 | 1 | 0 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 3 | 2 | |
| 00032 | 0 | 0 | 0 | 0 | 0 | 1 | 0 | 0 | 0 | 2 | 3 | 1 | 0 | |
| 02310 | 0 | 0 | 0 | 0 | 0 | 1 | 1 | 0 | 0 | 2 | 3 | 1 | 1 | Inc PC |
| 02311 | 0 | 0 | 0 | 0 | 0 | 0 | 0 | 0 | 0 | 0 | 0 | 0 | 0 | CLC |

| Micro Code Routine For A*2 | | | | | | | | | | | |
|---|---|---|---|---|---|---|---|---|---|---|---|
| Address | d23 | d22 | d21 | d20 | d19 | d18 | d17 | d16 | d15 | d14 | d13 |
| 00000 | 0 | 0 | 0 | 0 | 0 | 0 | 0 | 0 | 0 | 0 | 0 |
| 00033 | 0 | 0 | 0 | 0 | 0 | 0 | 0 | 0 | 0 | 0 | 0 |
| 02320 | 1 | 0 | 0 | 0 | 0 | 0 | 0 | 0 | 0 | 0 | 0 |
| 02321 | 1 | 0 | 0 | 0 | 0 | 0 | 0 | 0 | 0 | 1 | 0 |
| 02322 | 0 | 0 | 0 | 0 | 0 | 0 | 0 | 0 | 2 | 0 | 0 |
| 02323 | 0 | 0 | 0 | 0 | 0 | 0 | 1 | 0 | 2 | 1 | 0 |
| 02330 | 0 | 0 | 0 | 0 | 0 | 0 | 0 | 0 | 3 | 0 | 0 |
| 02331 | 0 | 1 | 0 | 0 | 0 | 0 | 0 | 0 | 3 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 0 | 3 | 3 | |
| 00033 | 0 | 0 | 0 | 0 | 0 | 1 | 0 | 0 | 0 | 2 | 3 | 2 | 0 | |
| 02320 | 0 | 1 | 0 | 0 | 0 | 1 | 1 | 0 | 0 | 2 | 3 | 2 | 1 | Inc PC |
| 02321 | 0 | 1 | 0 | 0 | 0 | 0 | 0 | 0 | 0 | 2 | 3 | 2 | 2 | A -> BS |
| 02322 | 0 | 1 | 0 | 0 | 0 | 0 | 0 | 0 | 0 | 2 | 3 | 2 | 3 | |
| 02323 | 0 | 1 | 0 | 0 | 0 | 0 | 0 | 0 | 0 | 2 | 3 | 3 | 0 | LSBS |
| 02330 | 0 | 1 | 0 | 0 | 0 | 0 | 0 | 0 | 0 | 2 | 3 | 3 | 1 | |
| 02331 | 0 | 1 | 0 | 0 | 0 | 0 | 0 | 0 | 0 | 0 | 0 | 0 | 0 | BS -> A |

| Micro Code Routine For A/2 | | | | | | | | | | | |
|---|---|---|---|---|---|---|---|---|---|---|---|
| Address | d23 | d22 | d21 | d20 | d19 | d18 | d17 | d16 | d15 | d14 | d13 |
| 00000 | 0 | 0 | 0 | 0 | 0 | 0 | 0 | 0 | 0 | 0 | 0 |
| 00100 | 0 | 0 | 0 | 0 | 0 | 0 | 0 | 0 | 0 | 0 | 0 |
| 03000 | 1 | 0 | 0 | 0 | 0 | 0 | 0 | 0 | 0 | 0 | 0 |
| 03001 | 1 | 0 | 0 | 0 | 0 | 0 | 0 | 0 | 0 | 1 | 0 |
| 03002 | 0 | 0 | 0 | 0 | 0 | 0 | 0 | 0 | 1 | 0 | 0 |
| 03003 | 0 | 0 | 0 | 0 | 0 | 0 | 1 | 0 | 1 | 1 | 0 |
| 03010 | 0 | 0 | 0 | 0 | 0 | 0 | 0 | 0 | 3 | 0 | 0 |
| 03011 | 0 | 1 | 0 | 0 | 0 | 0 | 0 | 0 | 3 | 0 | 0 |

| Address | d12 | d11 | d10 | d9 | d8 | d7 | d6 | d5 | d4 | d3 | d2 | d1 | d0 | Action |
|---|---|---|---|---|---|---|---|---|---|---|---|---|---|---|
| 00000 | 0 | 0 | 0 | 0 | 0 | 0 | 0 | 0 | 0 | 0 | 1 | 0 | 0 | |
| 00100 | 0 | 0 | 0 | 0 | 0 | 1 | 0 | 0 | 0 | 3 | 0 | 0 | 0 | |
| 03000 | 0 | 1 | 0 | 0 | 0 | 1 | 1 | 0 | 0 | 3 | 0 | 0 | 1 | Inc PC |
| 03001 | 0 | 1 | 0 | 0 | 0 | 0 | 0 | 0 | 0 | 3 | 0 | 0 | 2 | A -> BS |
| 03002 | 0 | 1 | 0 | 0 | 0 | 0 | 0 | 0 | 0 | 3 | 0 | 0 | 3 | |
| 03003 | 0 | 1 | 0 | 0 | 0 | 0 | 0 | 0 | 0 | 3 | 0 | 1 | 0 | RSBS |
| 03010 | 0 | 1 | 0 | 0 | 0 | 0 | 0 | 0 | 0 | 3 | 0 | 1 | 1 | |
| 03011 | 0 | 1 | 0 | 0 | 0 | 0 | 0 | 0 | 0 | 0 | 0 | 0 | 0 | BS -> A |

Operation—FIGS. 5-7

The function of the n Digit Register, FIG. 5, is to store n base four logic states. Each logic state is represented by a base four voltage level. This register is composed of n base four storage elements 500, and the function of each is to store a single base four voltage.

The base four storage element circuit, FIG. 6, functions as follows. First, a base four voltage level is placed on D4. This voltage level is converted to two binary voltage levels by the base four to base two converter 600, and these voltages are applied to the D inputs of the flip-flops 601. The dk line is, then, toggled from logic zero state to a logic one state, and the D input voltage levels are stored in the respective flip-flops. Also, these voltages are transferred to the respective Q outputs. The Q output voltage levels are converted to a base four voltage level by the base two to base four converter 602, and this output is present on Q4. The result is that the D4 input voltage level is transferred to Q4, an stored. The rst line, when in a logic zero state, clears the contents of both flip-flops. When the rst line has a logic one state, it has no effect.

The function of the Base Four to Base Two Converter, FIG. 7, is to convert a base four voltage level to two binary voltage levels. A base four logic zero state is typically zero volts. A base four logic one state is typically five volts. A logic two state is typically ten volts, and a logic three state is typically fifteen volts. A binary logic zero state is typically zero volts, and a binary logic one state is typically five volts.

This circuit performs its function as follows. The base four input voltage level, x, is compared to three different voltage thresholds by the comparators 700 701 702. If x is zero volts, or a logic zero state, then the outputs of all three comparators will be zero volts. If x is greater then or equal to (V1)/2, or a logic one state, then the output of comparator 700 will be Vs. If x is greater than or equal to 3*(V1)/2, or a logic two state, then the outputs of comparators 700 and 701 will be Vs, and if x is greater than or equal to 5*(V1)/2, or a logic three state, then the outputs of all three comparators will be Vs.

Each comparator has resistors ached to its output to divide the output down to a binary voltage level. These binary voltage levels are fed to logic gates, and the logic gates, in turn, produce the binary output voltages y0 and y1. The y0 output is the least significant bit, and the y1 output is the most significant bit. This circuit implements the following truth table.

| x | y1 | y0 |
|---|----|----|
| 0 | 0  | 0  |
| 1 | 0  | 1  |
| 2 | 1  | 0  |
| 3 | 1  | 1  |

Operation—FIGS. 8-10

The function of the Base Two to Base Four Converter, FIG. 8, is to encode two binary voltage levels as a single base four voltage level. This circuit performs its function by doubling the input voltage x1, the most significant bit, and adding the result to the input voltage x0, the least significant bit, to produce the output voltage y, a base four voltage level. Op amp 800 buffers, or multiplies by one, the x0 input. Op amp 801 doubles input x1, and op amp 802 adds the two results together. The binary and base four voltage levels are as previously described.

The SC ROM, FIG. 9, functions as follows. An address is placed on lines a0-a4, and one of the outputs of the Decoder 900 will have a logic one state. This output corresponds to the address that is input. The remaining outputs will have logic zero states.

If the address lines contain all zeros, decoder output y0 will have a logic one state, and the electronic switches 901 for SC ROM location zero will be enabled. This will cause the SC Data Bus lines d0, d1, and d2 to be connected to the system Data Bus 301 lines d0, d1, and d2 respectively. Also, SC Data Bus lines d3-d23 will be connected to a logic zero voltage level.

If any of the address lines contains a nonzero logic state, the corresponding decoder output will have a logic one state, and the electronic switches, ES, for the corresponding location will be enabled. This will cause the SC Data Bus lines to be connected to logic states that correspond to a micro code instruction.

The Decoder, FIG. 10, functions as follows. The decoder has n input lines and 4^n output lines. Each input line is connected to four level detectors. Each level detector will detect one of the base four logic levels. The level detector which corresponds to, or detects, the state of the input line will put out a logic one state. The remaining three level detectors for the input line will put out logic zero states. The outputs of the appropriate level detectors are ANDED together to produce a desired detector output. For example, all of the level zero detectors, LOD, are ANDED together to produce detector output y0.

Operation—FIGS. 11-16

The level detectors, FIGS. 11, 12, 13, and 14, function as follows. The input to each level detector is fed to a base four to base 2 converter, 4->2, and the binary outputs are combined, through logic gates, to produce the desired level detector output.

The function of the Electronic Switch, FIG. 15, is to make or break a current path Current can flow from in to out when en has a logic one state, but current can not flow when en has a logic zero state. When en has a logic one state, base current flows in Q1, and this enables sufficient base current to flow in Q2 to saturate Q2. Current can, therefore, flow through Q2 from in to out. When en has a logic zero state, however, no base current flows in either transistor, so no current can flow from in to out.

The function of the carry register, FIG. 16, is to store a single base four value. This register, which is composed of a single base four storage element, a level detector, and an inverter, functions as follows. The value that is present on the ci line is loaded into the storage element when the clk line is toggled from a logic zero state to a logic one state. The stored value is then present on the co line. This register is cleared when the cir line has a logic one state. When the clr line has any other state, it has no effect.

Operation—FIG. 17

The ALU, FIG. 17, is composed of level detectors, electronic switches, eight digit registers, and an adder multiplier circuit. This subsystem of components functions as follows.

The first number is loaded to the ALU as follows. The abpo line will have a logic zero state, and the output of level detector 1700 will have a logic one state. This will enable electronic switches 1701 and will connect data bus lines, d0-d7, to the input lines, x0-x7, respectively, of the eight digit register 1702. The clk line will then toggle from a logic zero state to a logic one state, and this will cause the eight digit register 1702 to load its input values. These values will then be present on the outputs, y0-y7, and on the inputs, b0-b7, of the adder multiplier circuit 1703.

The second number is loaded to the ALU as follows. The abpo line will have a logic one state, and the output of level detector 1704 will have a logic one state. This will enable electronic switches 1705 and will connect data bus lines, d0-d7, to the input lines, x0-x7, respectively, of the eight digit register 1706. The clk line will then toggle from a logic zero state to a logic one state, and this will cause the eight digit register 1706 to load its input values. These values will then be present on the outputs, y0-y7, and on the inputs, a0-a7, of the adder multiplier circuit 1703.

The adder multiplier circuit will perform an addition operation when the am line has a logic zero state. In an addition operation, inputs, a0-a7, are added to inputs, b0-b7, respectively. Also, the carry input, ci is added to the least significant digits of the other addends. The sum will be present on outputs, y0-y7, and the carry output will be present on co.

The adder multiplier circuit will perform a multiplication operation when the am line has a logic one state. In a multiplication operation, the inputs, a0-a7, are multiplied by input b0. Also, the carry input, ci, is added to the product of a0 and b0. The total product will be present on outputs, y0-y7, and the carry output will be present on co.

The result of the addition or multiplication operation is loaded to eight digit register 1707 when the abpo line has a logic two state, and the dk line toggles from a logic zero state to a logic one state.

The ALU will output its result to the data bus when the abpo line has a logic three state. When this line has a logic three state, the output of level detector 1709 will have a logic one state, and electronic switches 1708 will be enabled. This will connect outputs, y0-y7, of eight digit register 1707 to data bus lines, d0-d7, respectively. Also, the carry output of the adder multiplier circuit will be connected to the carry output, co, of the ALU.

Operation—FIGS. 18-20

The adder multiplier circuit, FIG. 18, is composed of an adder circuit, a multiplier circuit, level detectors, and electronic switches. This subsystem functions as follows.

The adder circuit 1800 adds inputs, a0-a7, to inputs, b0-b7, respectively. Also, the carry input, ci is added to the the least significant digits of the two addends. The sum is present on outputs, s0-s7, and the carry output is present on co.

The multiplier circuit 1801 multiplies inputs, a0-a7, by input b0. Also, the carry input, ci, is added to the product of a0 and b0. The product is present on outputs, p0-p7, and the carry output is present on co.

When the am line has a logic zero state, the output of level detector 1802 will have a logic one state, and electronic switches 1803 will be enabled. This will connect the adder circuit's outputs to the adder multiplier circuit's outputs, y0-y7, and co.

When the am line has a logic one state, the output of level detector 1804 will have a logic one state, and electronic switches 1805 will be enabled. This will connect the multiplier circuit's outputs to the adder multiplier circuit's outputs, y0-y7, and co.

When the am line has any other state, the adder circuit's outputs, and the multiplier circuit's output will be effectively disconnected from the adder multiplier circuit's outputs.

The adder circuit, FIG. 19, is composed of eight base four adders. Base four adder 1900 adds together inputs a0, b0, and ci. The sum is present on output s0. The carry output is fed to the carry input of adder 1901, and the process is repeated for the remaining seven digits.

The multiplier circuit, FIG. 20, which is composed of base four multiplier circuits, and base four adder circuits, functions as follows. Base four multiplier 2000 multiplies together inputs a0 and b0. The product is fed to adder 2001, and the carry output is fed to adder 2002. Base four adder 2001 adds the product of a0 and b0 to the carry input ci. The sum is output as p0. Base four adder 2002 adds together the carry, that resulted from the product of a0 and b0, to the carry that resulted from the addition of ci. This sum is fed to the carry input to the next digit, and the process is repeated for the remaining digits.

Operation—FIGS. 21-22

The base four adder, FIG. 21, is composed of two base four to base two converters, two binary full adders, and one base two to base four converter. The a and b inputs are converted to binary by converters 2100 and 2101. The a0, b0 values, and the carry input ci are added together by full adder 2102. The sum of these values is fed to the s0 input of converter 2104, and the carry output, co, is fed to the carry input of adder 2103. This adder adds together a1, b1 and its carry input, ci. This sum is fed to the s1 input of converter 2104, and the carry is output as co. Converter 2104 converts the binary values s0 and s1 to the base four value s.

The base four multiplier, FIG. 22, is composed of two base four to base two converters, several AND gates, OR gates, and inverters, and two base two to base four converters. The a and b inputs are converted to binary values by converters 2200 and 2201. These binary values, a0, a1, b0, and b1, are combined by the logic gates to yield a product p0, p1, and a carry c0, c1. The truth table for this logic circuit is shown below. The binary values for the product and carry are converted to base four values by converters 2202 and 2203 respectively.

| b1 | b0 | a1 | a0 | c1 | c0 | p1 | p0 |
|----|----|----|----|----|----|----|----|
| 0  | 0  | 0  | 0  | 0  | 0  | 0  | 0  |
| 0  | 0  | 0  | 1  | 0  | 0  | 0  | 0  |
| 0  | 0  | 1  | 0  | 0  | 0  | 0  | 0  |
| 0  | 0  | 1  | 1  | 0  | 0  | 0  | 0  |
| 0  | 1  | 0  | 0  | 0  | 0  | 0  | 0  |
| 0  | 1  | 0  | 1  | 0  | 0  | 0  | 1  |
| 0  | 1  | 1  | 0  | 0  | 0  | 1  | 0  |
| 0  | 1  | 1  | 1  | 0  | 0  | 1  | 1  |
| 1  | 0  | 0  | 0  | 0  | 0  | 0  | 0  |
| 1  | 0  | 0  | 1  | 0  | 0  | 1  | 0  |
| 1  | 0  | 1  | 0  | 0  | 1  | 0  | 0  |
| 1  | 0  | 1  | 1  | 0  | 1  | 1  | 0  |
| 1  | 1  | 0  | 0  | 0  | 0  | 0  | 0  |
| 1  | 1  | 0  | 1  | 0  | 0  | 1  | 1  |
| 1  | 1  | 1  | 0  | 0  | 1  | 1  | 0  |
| 1  | 1  | 1  | 1  | 1  | 0  | 0  | 1  |

Figure 23:
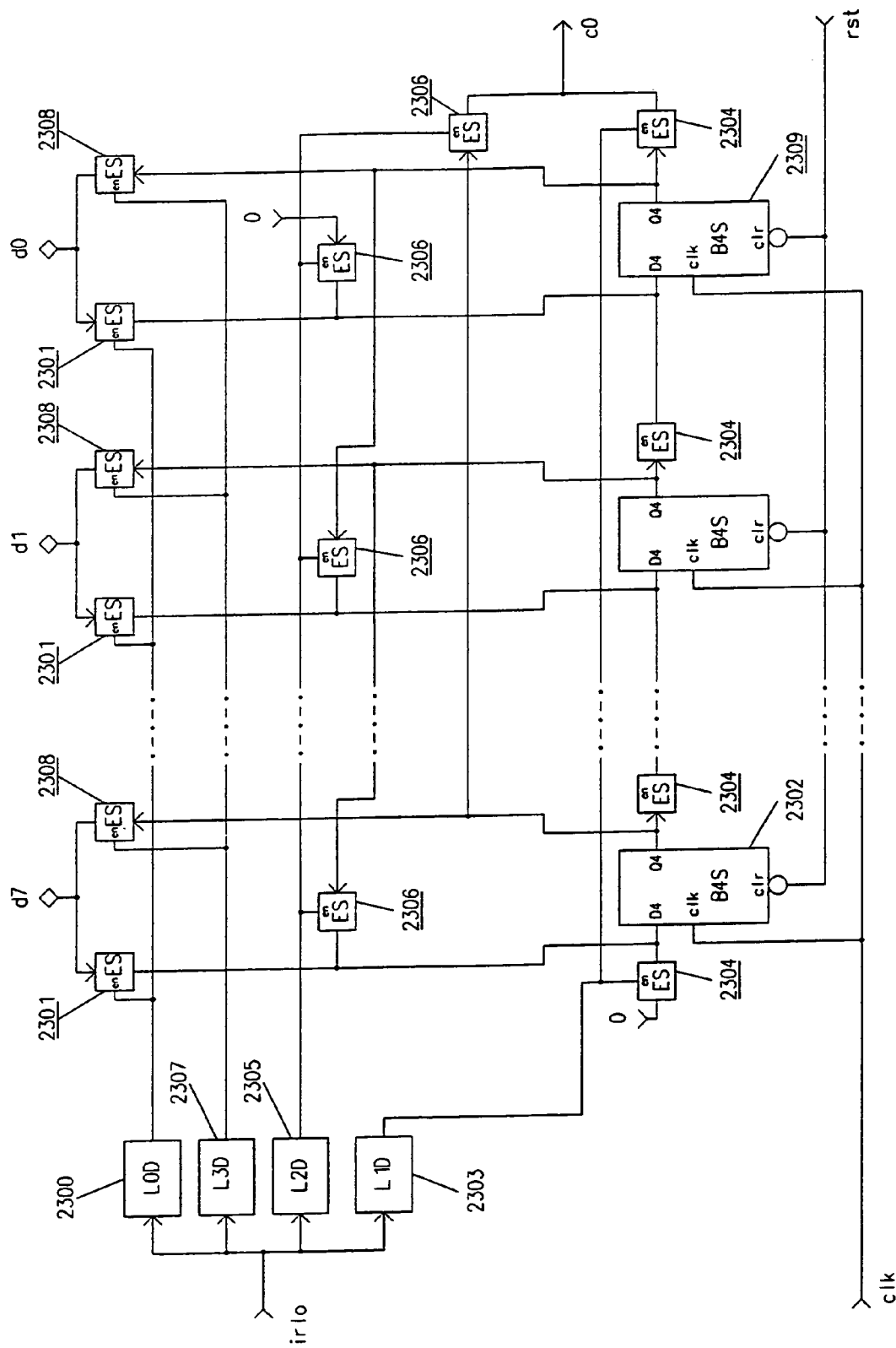
FIG. 23 shows a block diagram of the base four shift register S.

Operation—FIG. 23

The S register, FIG. 23, is a base four shift register, and is composed of level detectors, electronic switches, and base four storage elements. This register has four modes of operation, and operates as follows.

When the irlo line has a logic zero state, this register is in the input mode of operation. In this mode, the output of level detector 2300 has a logic one state. Electronic switches 2301 are enabled, and the data bus, d0-d7, is connected to the Q4 inputs of the base four storage elements. When the clk line toggles from a logic zero state to a logic one state, the contents of the data bus is loaded into the base four storage elements.

When the irlo line has a logic one state, this register is in the right shift mode. In this mode, the output of level detector 2303 has a logic one state, and this enables electronic switches 2304. The Q4 output of each storage element is, then, connected to the D4 input of the storate element to the right. Also, a zero is connected to the D4 input to the left most element 2302, and the Q4 output of the right most element 2309 is connected to the carry output line, co. When the clk line toggles from a logic zero state to a logic one state, the contents of each storage element is moved to the storage element to the right. Also, a zero is loaded into the left most storage element 2302, and the contents of the right most storage element 2309 is loaded into the carry register.

When the irlo line has a logic two state, this register is in the left shift mode. In this mode, the output of level detector 2305 has a logic one state, and this enables electronic switches 2306. The Q4 output of each storage element is, then, connected to the D4 input of the storate element to the left. Also, a zero is connected to the D4 input to the right most element 2309, and the Q4 output of the left most element 2302 is connected to the carry output line, co. When the clk line toggles from a logic zero state to a logic one state, the contents of each storage element is moved to the storage element to the left. Also, a zero is loaded into the right most storage element 2309, and the contents of the left most storage element 2302 is loaded into the carry register.

When the irlo line has a logic three state, this register is in the output mode. In this mode, the output of level detector 2307 has a logic one state, and electronic switches 2308 are enabled. This causes the Q4 outputs of the storage elements to be connected to the data bus, d0-d7.

Figure 24:
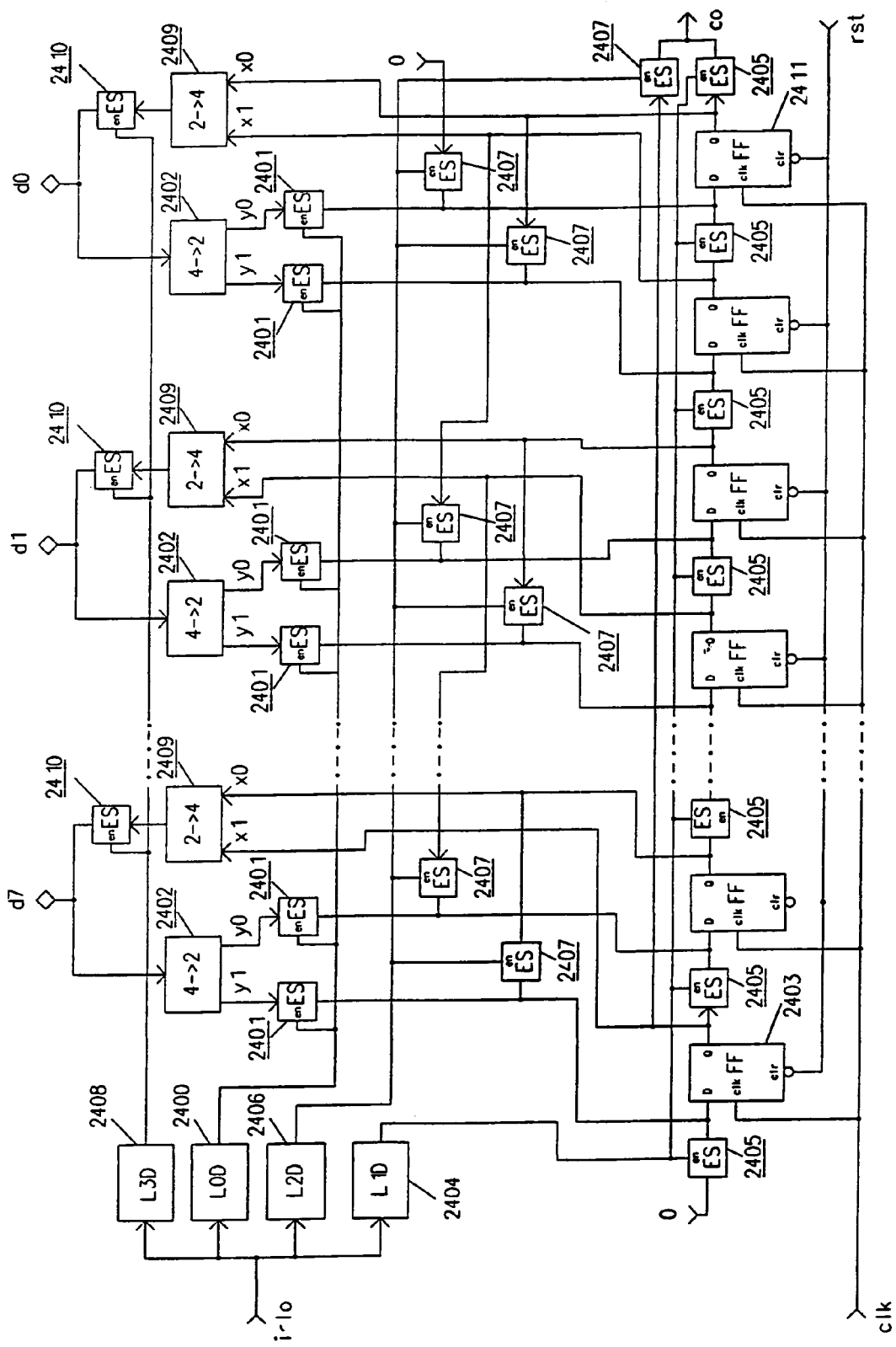
FIG. 24 shows a block diagram of the binary shift register BS.

Operation—FIG. 24

The BS register, FIG. 24, is a binary shift register. This register functions similar to the S register, but the BS register's contents is binary instead of base four. The BS register is composed of level detectors, base four to base two converters, base two to base four converters, electronic switches, and flip flops. This register has four modes of operation, and operates as follows.

When the irlo line has a logic zero state, this register is in the input mode of operation. In this mode, the output of level detector 2400 has a logic one state, and electronic switches 2401 are enabled. Also, data bus lines d0-d7 are connected to base four to base two converters 2402, and the outputs of these converters are fed through electronic switches 2401 to the D inputs of the flip flops. When the clk line toggles from a logic zero state to a logic one state, the contents of the data bus is converted to binary and is loaded into the flip flops.

When the irlo line has a logic one state, this register is in the right shift mode. In this mode, the output of level detector 2404 has a logic one state, and this enables electronic switches 2405. The Q output of each flip flop is, then, connected to the D input of the flip flop to the right. Also, a zero is connected to the D input to the left most flip flop 2403, and the Q output of the right most flip flop 2411 is connected to the carry output line, co. When the clk line toggles from a logic zero state to a logic one state, the contents of each flip flop is moved to the flip flop to the right. Also, a zero is loaded into the left most flip flop 2403, and the contents of the right most flip flop 2411 is loaded into the carry register.

When the irlo line has a logic two state, this register is in the left shift mode. In this mode, the output of level detector 2406 has a logic one state, and this enables electronic switches 2407. The Q output of each flip flop is, then, connected to the D input of the flip flop to the left. Also, a zero is connected to the D input to the right most flip flop 2411, and the Q output of the left most flip flop 2403 is connected to the carry output line, co. When the clk line toggles from a logic zero state to a logic one state, the contents of each flip flop is moved to the flip flop to the left. Also, a zero is loaded into the right most flip flop 2411, and the contents of the left most flip flop 2403 is loaded into the carry register.

When the irlo line has a logic three state, this register is in the output mode. In this mode, the output of level detector 2408 has a logic one state, and electronic switches 2410 are enabled. Also, the Q outputs of the flip flops are converted to base four by base two to base four converters 2409, and the outputs of these converters are fed through electronic switches 2410 to the data bus lines d0-d7.

Figure 25:
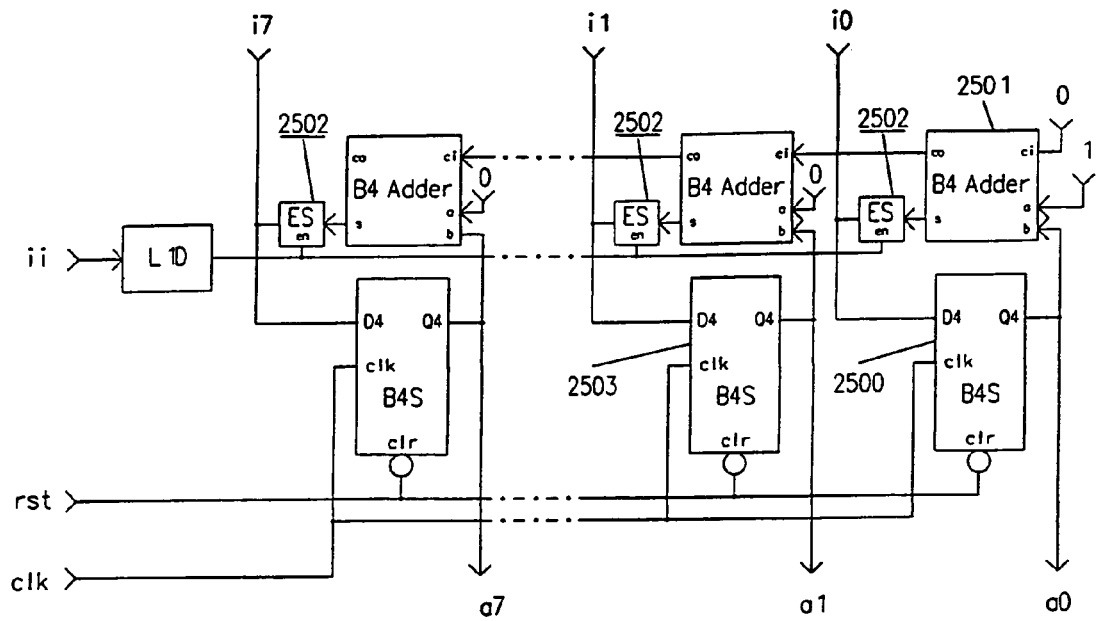
FIG. 25 shows a block diagram of the program counter PC.
Figure 26:
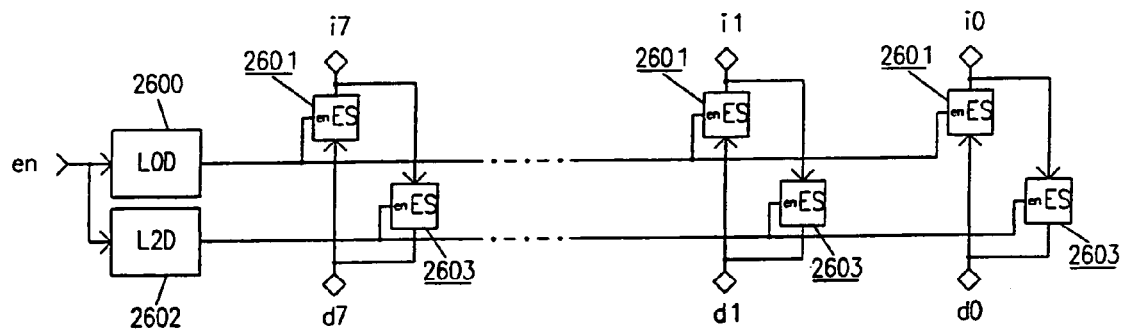
FIG. 26 shows a block diagram of the DP switch.

Operation—FIGS. 25-26

The PC register, FIG. 25, is composed of a level detector, electronic switches, base four adders, and base four storage elements. This register has two modes of operation, and functions as follows.

When the ii line has a logic zero state, this register is in the input mode, and the intermediate bus lines i0-i7 are connected to the D4 inputs of the base four storage elements. When the clk line toggles from a logic zero state to a logic one state, the contents of the intermediate bus is loaded into the base four storage elements. The Q4 outputs are present on the address bus lines, a0-a7.

When the ii line has a logic one state, this register is in the increment mode. When the register is in this mode, the output of the level detector has a logic one state, and this enables the electronic switches. Also, the Q4 output of storage element 2500, which stores the least significant digit, has a one added to it by adder 2501. This sum is fed through electronic switch 2504 to the D4 input of this storage element 2500. The carry from this addition is added to the Q4 output of storage element 2503, which stores the next more significant digit, and this sum is present on the D4 input of this storage element 2503. The carry from this addition is fed to the next digit, and this process is repeated for this and the remaining digits. When the elk line toggles from a logic zero state to a logic one state, the D4 inputs are loaded into the respective storage elements, so the PC register is incremented. The Q4 outputs are present on the address bus lines, a0-a7.

The DP switch, FIG. 26, functions to couple the data bus and the intermediate bus. This switch is composed of level detectors, and electronic switches. The DP switch has three modes of operation, and operates as follows.

When the en line has a logic zero state, the output of level detector 2600 has a logic one state, and electronic switches 2601 are enabled. Data can, then, flow from the data bus lines, d0-d7, to the intermediate bus lines, i0-i7, respectively.

When the en line has a logic two state, the output of level detector 2602 has a logic one state, and electronic switches 2603 are enabled. Data can, then, flow from the intermediate bus lines, i0-i7, to the data bus lines, d0-d7, respectively.

When the en line has either a logic one state or a logic three state, the DP switch is disabled, and the data and intermediate buses are effectively uncoupled.

Figure 27:
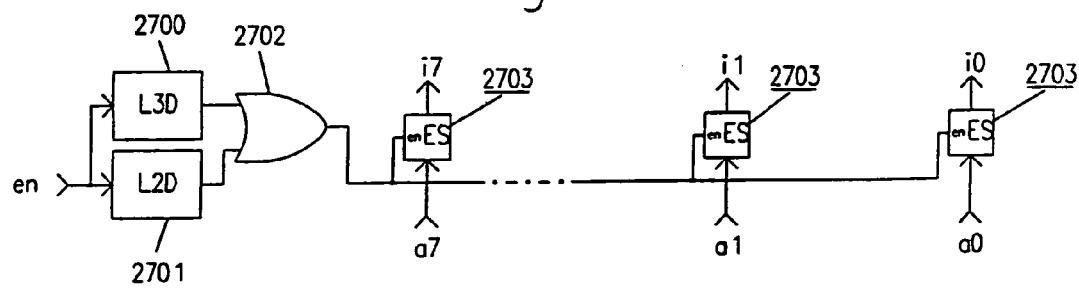
FIG. 27 shows a block diagram of the PCP switch
Figure 28:
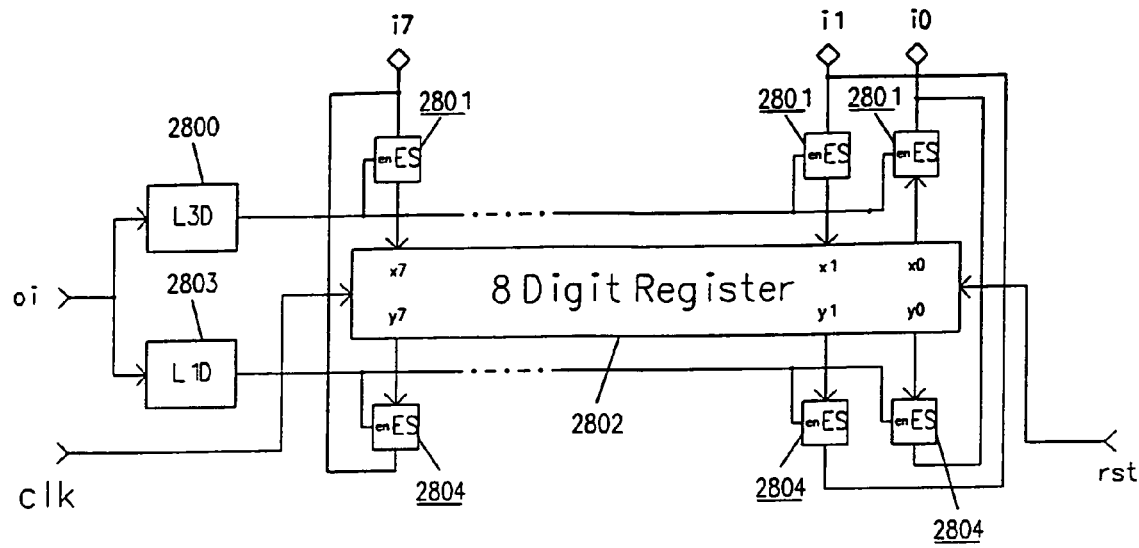
FIG. 28 shows a block diagram of the P register.
Figure 29:
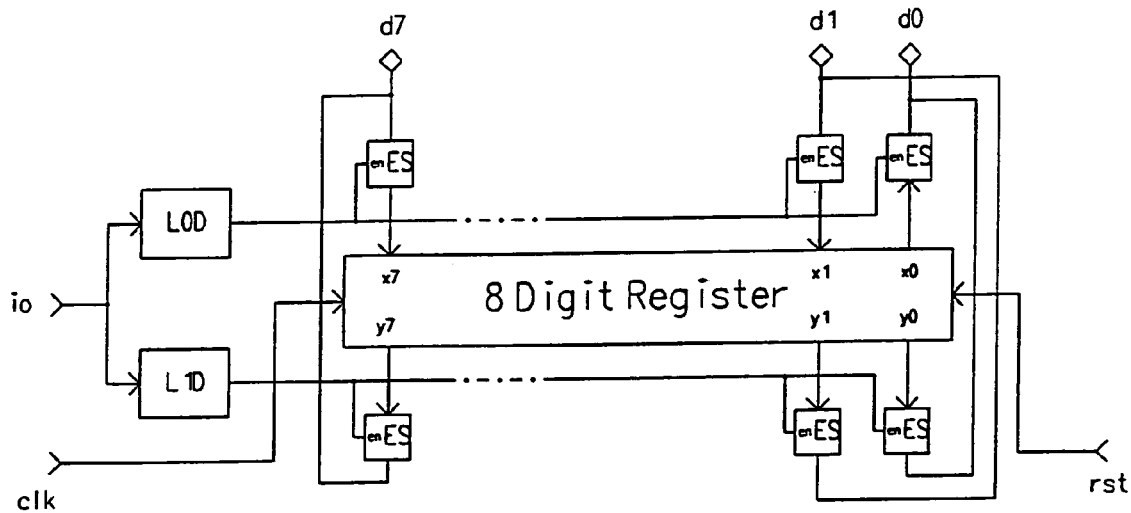
FIG. 29 shows a block diagram of the accumulator register A

Operation—FIGS. 27-29

The PCP switch, FIG. 27, functions to connect the address bus to the intermediate bus. This switch is composed of level detectors, an OR gate, and electronic switches. The PCP switch has two modes of operation, and functions as follows.

When the en line has either a logic two or a logic three state, the output of the respective level detector 2700 2701 will have a logic one output. The output of OR gate 2702 will, therefore, have a logic one output, and electronic switches 2703 will be enabled. Data will, then, be able to flow from the address bus lines, a0-a7 to the intermediate bus lines, i0-i7, respectively.

When the en line has either a logic one or a logic two state, the PCP switch is disabled, and the address and intermediate busses are effectively disconnected.

The P register, FIG. 28, is composed of level detectors, electronic switches, and an eight digit base four register. This register has three modes of operation, and functions as follows.

When the oi line has a logic three state, the output of level detector 2800 will have a logic one state, and electronic switches 2801 will be enabled. The intermediate bus lines, i0-i7, will, then, be connected to the register's input lines x0-x7, respectively. When the clk line toggles from a logic zero state to a logic one state, the values, present on the intermediate bus lines, will be loaded into the register.

When the oi line has a logic one state, the output of level detector 2803 will have a logic one state, and electronic switches 2804 will be enabled. The register's output lines, y0-y7, will, then, be connected to the intermediate bus lines, i0-i7, respectively.

When the oi line has either a logic zero state or a logic one state, the P register is disabled. That is, this register is effectively disconnected from the intermediate bus.

The A register, FIG. 29, is composed, and functions, very similar to the P register. The A register inputs data from the data bus lines, d0-d7, when the io line has a logic zero state, and the clk line toggles from a logic zero state to a logic one state. The A register outputs data to the data bus when the io line has a logic one state, and the A register is disabled when the io line has either a logic two or a logic three state.

Figure 30:
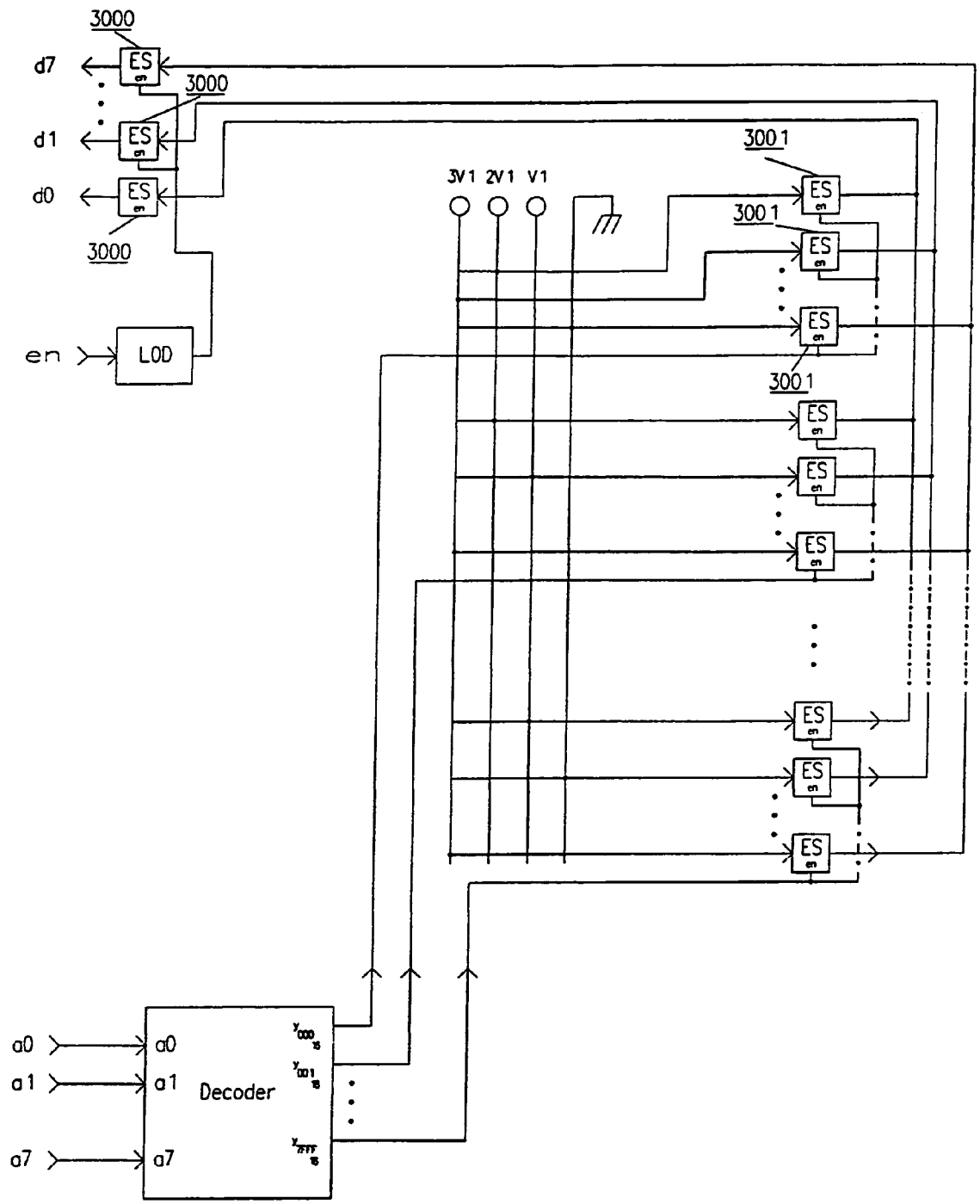
FIG. 30 shows a block diagram of the system ROM.
Figure 31:
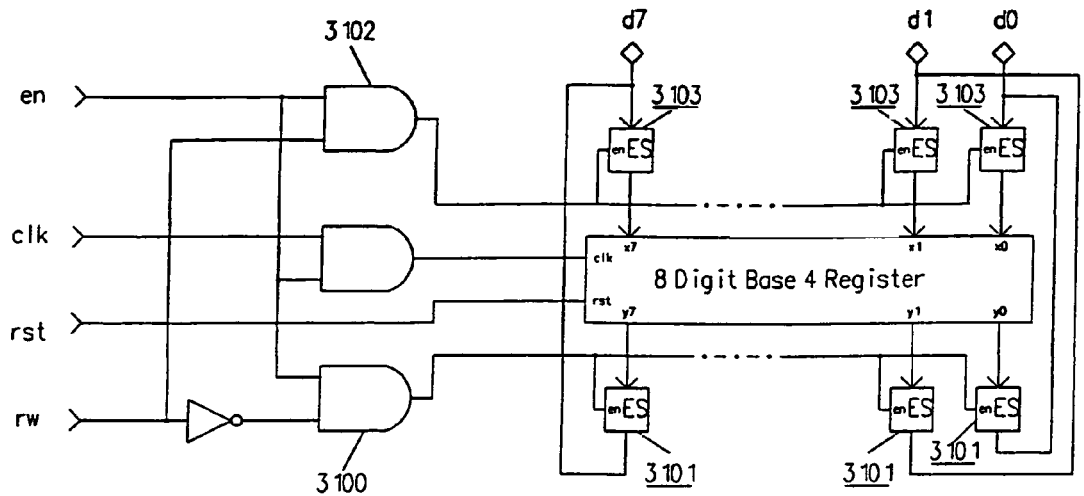
FIG. 31 shows a block diagram of a base four RAM element.

Operation—FIGS. 30-31

The ROM, FIG. 30, is the system read only memory that permanently stores macro instructions. This sub system has two modes of operation, and functions as follows.

When the en line has a logic one, logic two, or logic three state, the ROM is disabled, and is effectively disconnected from the data bus.

When the en line has a logic zero state, the output of the level detector will have a logic one state, and electronic switches 3000 will be enabled. The ROM will be enabled, and the contents of the selected location will be present on the data bus.

A ROM location is selected as follows. An address is placed on the address bus lines, a0-a7. If this address is within the hex range 0000 to 7FFF inclusive, the corresponding output of the decoder will have a logic one state. The remaining outputs of the decoder will have logic zero states. The logic one state will enable the electronic switches of the corresponding ROM location, and this will connect each of the data bus lines, d0-d7, to a base four voltage level. For example, if the hex address 0000 is placed on the address bus, output y0 of the decoder will have a logic one state, and electronic switches 3001 will be enabled. The data bus lines will be connected to base four voltage levels which correspond to the first macro instruction of the program.

The RAM element, FIG. 31, is the basic element of the random access memory. This sub system has three modes of operation, and functions as follows.

When the RAM element is in the read mode, the en line will have a logic one state, and the rw line will have a logic zero state. This will cause the output of AND gate 3100 to have a logic one state, and this will enable electronic switches 3101. The register's output lines, y0-y7, will then, be connected to the data bus lines, d0-d7, respectively, and the register's contents will be present on the data bus.

When the RAM element is in the write mode, the en and rw lines will both have logic one states. This will cause the output of AND gate 3102 to have a logic one state, and this will enable electronic switches 3103. The register's input lines, x0-x7, will, then, be connected to the data bus lines, d0-d7, respectively. When the clk line toggles from a logic zero to a logic one state, the values that are present on the data bus lines will be loaded into the register.

When the RAM element is in the disabled mode, the en has a logic zero state, and the element is effectively disconnected from the data bus.

Operation—FIGS. 32-35

Figure 32:
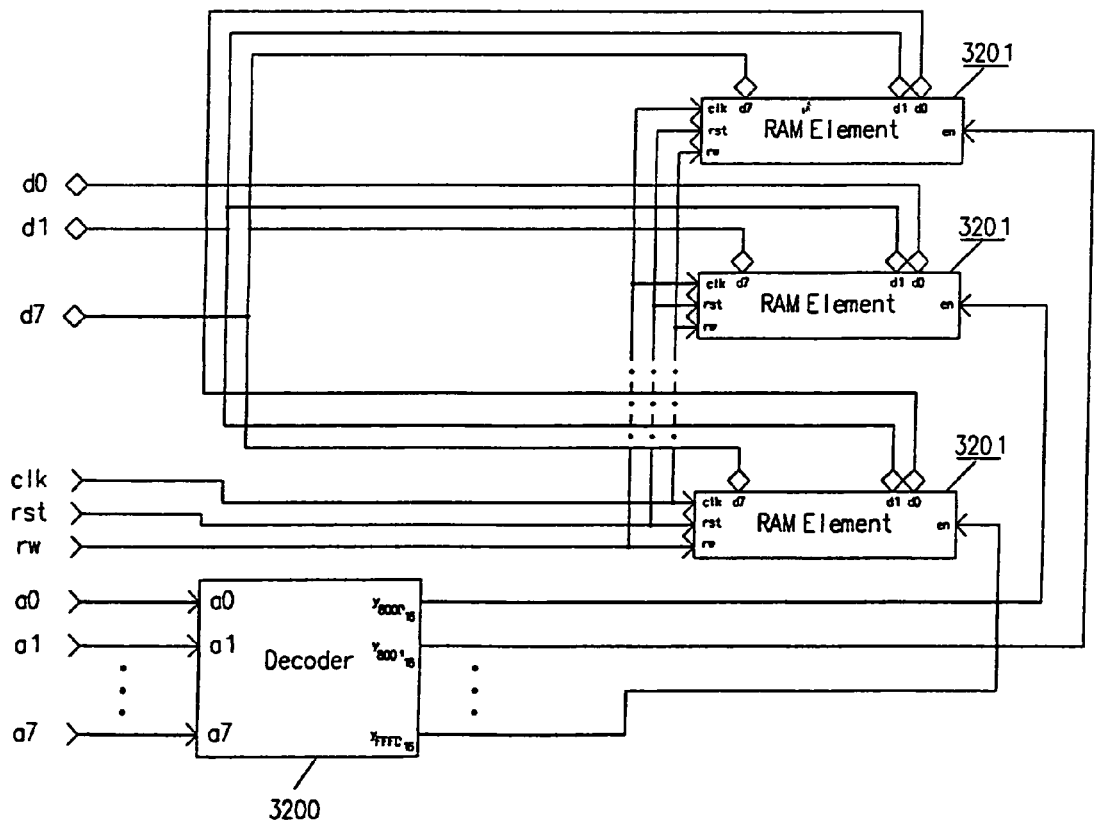
FIG. 32 shows a block diagram of the system RAM.

The RAM, FIG. 32, is the system random access memory. This memory serves as a scratch pad for the system program. This sub system has two modes of operation, and functions as follows.

The two modes of operation are read and write. When the RAM is in the read mode, a RAM element is selected, and its contents is placed on the data bus. When the RAM is in the write mode, a RAM element is selected, and the contents of the data bus is written to the element when the clk line toggles from a logic zero state to a logic one state.

A RAM element is selected as follows. An address is placed on the address bus lines, a0-a7. If this address is within the hex range 8000 to FFFD inclusive, the corresponding output of the decoder will have a logic one state. The remaining outputs of the decoder will have logic zero states. The logic one state will enable the corresponding RAM element.

The A to D converter, FIG. 33, functions as follows. The analog signal, x, is sampled by the binary A to D converter, and is converted to a sixteen bit binary number. The binary outputs are converted to base four by the base two to base four converters. The outputs of these converters will be present on the data bus lines, d0-d7, whenever the A to D converter is selected.

The A to D converter is selected when the hex address FFFE is present on the address bus. When this is the case, the corresponding output of the decoder will have a logic one state, and this will enable the electronic switches.

The D to A converter, FIG. 34, functions as follows. This converter is selected when the hex address FFFF is present on the address bus. When this is the case, the corresponding output of the decoder will have a logic one state, and this will enable the electronic switches.

When the D to A converter is selected, the data bus lines, d0-d7, will be connected to the inputs of the base four to base two converters. The outputs of these converters are input to the D to A converter. This converter converts the sixteen bit binary number to an analog voltage level, and outputs this voltage on y.

The function of the power supply circuit, FIG. 35, is to supply the necessary voltages, as well as the clock and reset signals, to the system. This circuit functions as follows. When 110 VAC is applied to the power supply the output voltages stabilize at their nominal values, and the clock starts. Then, about fifty milliseconds later, the reset output toggles from a logic zero state to a logic one state, and this allows the clock signal to pass through the AND gate to the circuit.

SUMMARY, RAMIFICATIONS, SCOPE

In this invention, a digital signal processing system is proposed which encodes signal values, and performs computations, using the base four numbering system. This encoding scheme enables computations to be performed using far fewer arithmetic operations than would be required by an equivalent binary system performing an equivalent computation. The proposed system, therefore, has much better through put than a state of the art system.

The above description contains many specifications, but these should not be construed as limitations on the scope of this invention. These specifications are exemplifications of one preferred embodiment. Other embodiments are possible. Accordingly, the scope of this invention should be determined, not by the embodiment illustrated, but by the appended claims and their legal equivalents.

REFERENCE NUMERALS IN DRAWINGS

301 The data bus
302 The intermediate bus
303 The program counter PC
304 The DP switch
305 The PCP switch
306 The P register
307 The accumulator A
308 The carry register C 309 The arithmetic logic unit ALU
310 The base four shift register S
311 The binary shift register BS
312 The system ROM
313 The system RAM
314 The base four analog to digital converter
315 The base four digital to analog converter
316 The system controller
400 The system controller ROM
401 The system controller data bus
402 The 24 digit base four register in the system controller
500 Base four storage elements B4S in an n digit register
600 The base four to base two converter 4->2 in a base four storage element
601 The binary flip-flops FF in a base four storage element
602 The base two to base four converter 2->4 in a base four storage element
700, 701, 702 comparators in the 4->2
800, 801, 802 Op amps in the 2->4
900 The decoder in the system controller ROM
901 The electronic switches which are enabled when SC ROM location zero is addressed
1700 The level detector which outputs a logic one state when the ALU inputs its first number
1701 The electronic switches which are enabled when the ALU inputs its first number
1702 The eight digit base four which stores the first number in the ALU
1703 The adder multiplier circuit
1704 The level detector which outputs a logic one state when the ALU inputs its second number
1705 The electronic switches which are enabled when the ALU inputs its second number
1706 The eight digit base four which stores the second number in the ALU
1707 The eight digit base four register which stores the result of the arithmetic operation on the two numbers
1708 The electronic switches which are enabled when the ALU outputs its result
1800 The adder circuit in the ALU
1801 The multiplier circuit in the ALU
1802 The level detector which outputs a logic one state when the adder multiplier circuit is in the addition mode
1803 The electronic switches which are enabled when the adder multiplier is in the addition mode
1804 The level detector which outputs a logic one state when the adder multiplier circuit is in the multiplication mode
1805 The electronic switches which are enabled when the adder multiplier is in the multiplication mode
1900 The base four adder which adds together the least significant digits of the addends
1901 The base four adder which adds together the second least significant digits of the addends
2000 The base four multiplier which multiplies together the least significant digit of the multiplicand and the multiplier
2001 The base four adder which adds a carry to the product of the least significant digit and the multiplier
2002 The base four adder which the carry, which was generated from the product, to the carry which was generated from the previous addition
2100 The 4->2 which converts the first base four addend to binary
2101 The 4->2 which converts the second base four addend to binary
2102 The binary full adder which adds together the least significant bits of the addends
2103 The binary full adder which adds together the second least significant bits of the addends
2104 The 2->4 which converts the binary sums to a base four number
2200 The 4->2 which converts the base four multiplier to binary
2201 The 4->2 which converts the base four multiplicand to binary
2202 The 2->4 which converts the binary product to base four
2203 The 2->4 which converts the carry to base four
2300 The level detector which outputs a logic one state when the base four shift register is in its input mode
2301 The electronic switches which are enabled when the base four shift register is in its input mode
2302 The B4S which stores the most significant digit of the base four number that is being shifted
2303 The level detector which outputs a logic one state when the base four shift register is in its right shift mode
2304 The electronic switches which are enabled when the base four shift register is in its right shift mode
2305 The level detector which outputs a logic one state when the base four shift register is in its left shift mode
2306 The electronic switches which are enabled when the base four shift register is in its left shift mode
2307 The level detector which outputs a logic one state when the base four shift register is in its output mode
2308 The electronic switches which are enabled when the base four shift register is in its output mode
2400 The level detector which outputs a logic one state when the binary shift register is in its input mode
2401 The electronic switches which are enabled when the binary shift register is in its input mode
2402 The 4->2 which convert the base four input number to binary
2403 The flip-flop which stores the most significant bit of the member that is being shifted
2404 The level detector which outputs a logic one state when the binary shift register is in its right shift mode
2405 The electronic switches which are enabled when the binary shift register is in its right shift mode
2406 The level detector which outputs a logic one state when the binary shift register is in its left shift mode
2407 The electronic switches which are enabled when the binary shift register is in its left shift mode
2408 The level detector which outputs a logic one state when the binary shift register is in its output mode
2409 The 2->4 which convert the shifted binary number to base four
2410 The electronic switches which are enabled when the binary shift register is in its output mode
2411 The flip-flop which stores the least significant bit of the number that is being shifted
2500 The B4S which stores the least significant digit of the address
2501 The base four adder which increments the least significant digit of the address
2502 The electronic switches which are enabled when the program counter is in its increment mode
2503 The B4S which stores the second least significant digit of the address
2600 The level detector which outputs a logic one state when the DP switch is enabled and is passing data from the data bus to the intermediate bus
2601 The electronic switches which are enabled when the DP switch is passing data from the data bus to the intermediate bus

2602 The level detector which outputs a logic one state when the DP switch is enabled and is passing data from the intermediate bus to the data bus

2603 The electronic switches which are enabled when the DP switch is passing data from the intermediate bus to the data bus

2700 One of the level detectors which outputs a logic one state to enable the PCP switch

2701 One of the level detectors which outputs a logic one state to enable the PCP switch

2702 An OR gate which combines the outputs of the level detectors

2703 The electronic switches which are enabled when the PCP switch is enabled

2800 The level detector which outputs a logic one state when the P register is in its input mode

2801 The electronic switches which are enabled when the P register is in its input mode

2802 An eight digit base four register which stores an address

2803 The level detector which outputs a logic one state when the P register is in its output mode

2804 The electronic switches which are enabled when the P register is in its output mode

3000 The electronic switches which are enabled when the system ROM is enabled

3001 The electronic switches which are enabled when the zeroth element of the system ROM is addressed

3100 An AND gate which outputs a logic one state when the RAM element is enabled and is in its read mode

3101 The electronic switches which are enabled when the RAM element is in its read mode

3102 An AND gate which outputs a logic one state when the RAM element is enabled and is in its write mode

3103 The electronic switches which are enabled when the RAM element is in its write mode

3200 The decoder in the system RAM

3201 The system RAM elements

What is claimed is:

1. An apparatus for sequentially processing arithmetic between a first data and a second data, each of said first and said second data being an analog signal, comprising:

input means having an input of an analog signal for sequentially receiving said first data and said second data, and for sequentially outputting a first set of base four data representing said first data and a second set of base four data representing said second data;

processing means connected to said input means for adding, subtracting, multiplying, or dividing said second set of base four data and said first set of base four data; and output means, connected to said processing means, for converting output of said processing means into an analog signal.

2. An apparatus according to claim 1, wherein said input means includes an analog to digital converter.

3. An apparatus according to claim 2, wherein said analog to digital converter includes an input command signal to start a conversion.

4. An apparatus according to claim 2, wherein said analog to digital converter includes an output signal indicating that a conversion is complete.

5. An apparatus according to claim 1, wherein said output means includes a digital to analog converter.

6. A processing means for sequentially processing addition, subtraction, multiplication, or division between a first set of base four data and a second set of base four data comprising:

an arithmetic logic unit for performing said addition, said subtraction, said multiplication, or said division to yield an output;

a system controller connected to said arithmetic logic unit for controlling the operation of said arithmetic logic unit; and a memory connected to said system controller for storing instructions for said system controller.

7. A processing means according to claim 6, wherein said arithmetic logic unit includes a parallel input port for base four data.

8. A processing means according to claim 6, wherein said arithmetic logic unit includes a parallel output port for base four data.

9. A processing means according to claim 6, wherein said system controller outputs a plurality of control signals which are base four logic.

10. A processing means according to claim 6, wherein said system controller includes a binary clock input.

11. A processing means according to claim 6, wherein, said memory stores said instructions as base four logic.

* * * * *